U S 0 0 5 6 4 1 7 1 7 A

US005641717A

United States Patent [19]

Castle

[11] Patent Number: 5,641,717
[45] Date of Patent: Jun. 24, 1997

[54] COMPOSITIONS COMPRISING FUSED PARTICULATES AND METHODS OF MAKING SAME

[76] Inventor: Richard B. Castle, P.O. Box 33427, St. Paul, Minn. 55133-3427

[21] Appl. No.: 526,773

[22] Filed: Sep. 21, 1995

Related U.S. Application Data

[63] Continuation of Ser. No. 231,937, Apr. 25, 1994, abandoned.

[51] Int. Cl.$^6$ .......................... C03C 12/00; C03C 3/083
[52] U.S. Cl. .................. 501/33; 501/27; 501/69; 501/70; 501/72
[58] Field of Search .......................... 501/27, 33, 69, 501/70, 72

[56] References Cited

U.S. PATENT DOCUMENTS

| | | | |
|---|---|---|---|
| 1,995,803 | 3/1935 | Gilbert | 423/335 |
| 2,044,680 | 6/1936 | Gilbert | 423/326 |
| 2,987,408 | 6/1961 | Minnick | 106/709 |
| 3,069,292 | 12/1962 | Alexander et al. | 428/404 |
| 3,290,165 | 12/1966 | Iannicelli | 106/475 |
| 3,365,315 | 1/1968 | Beck et al. | 501/33 |
| 3,493,403 | 2/1970 | Tung et al. | 501/34 |
| 3,567,680 | 3/1971 | Iannicelli | 106/487 |
| 3,653,865 | 4/1972 | Megles | 501/70 |
| 3,661,673 | 5/1972 | Merriam | 428/406 |
| 3,679,446 | 7/1972 | Kubo | 106/796 |
| 3,773,707 | 11/1973 | Hermann | 524/450 |
| 3,834,924 | 9/1974 | Grillo | 501/144 |
| 3,836,504 | 9/1974 | Morisawa | 523/220 |
| 3,838,998 | 10/1974 | Matthews et al. | 501/29 |
| 3,839,253 | 10/1974 | Kershaw et al. | 523/223 |
| 3,961,978 | 6/1976 | Brodmann | 106/409 |
| 3,980,611 | 9/1976 | Anderson et al. | 523/220 |
| 4,042,732 | 8/1977 | Ferrar | 524/523 |
| 4,115,256 | 9/1978 | de Zeeuw | 209/3 |
| 4,147,687 | 4/1979 | O'Donnell | 524/65 |
| 4,201,560 | 5/1980 | Dewitte et al. | 65/21 |
| 4,229,329 | 10/1980 | Bennett | 524/44 |
| 4,267,089 | 5/1981 | Brown | 524/432 |
| 4,268,320 | 5/1981 | Klingaman et al. | 106/467 |
| 4,294,750 | 10/1981 | Klingaman et al. | 524/493 |
| 4,298,386 | 11/1981 | Kubo et al. | 501/80 |
| 4,446,207 | 5/1984 | Dewitte et al. | 428/402 |
| 4,475,936 | 10/1984 | Aston et al. | 65/142 |
| 4,661,137 | 4/1987 | Garnier et al. | 65/21.4 |
| 4,715,878 | 12/1987 | Kopatz et al. | 264/7 |
| 4,767,726 | 8/1988 | Marshall | 501/33 |
| 4,778,502 | 10/1988 | Garnier et al. | 65/22 |
| 4,923,520 | 5/1990 | Anzai et al. | 106/490 |
| 4,961,770 | 10/1990 | Johnson et al. | 65/21.3 |
| 4,994,506 | 2/1991 | Anton et al. | 523/155 |
| 5,326,806 | 7/1994 | Yokoshima et al. | 524/411 |

FOREIGN PATENT DOCUMENTS

| | | |
|---|---|---|
| 875238A | 10/1979 | Belgium . |
| 2421149A | 11/1979 | France . |
| 2529879 | 1/1984 | France . |
| 1928337 | 1/1970 | Germany . |
| 1908471 | 10/1970 | Germany . |
| 2912310A | 10/1979 | Germany . |
| 2953526 | 8/1984 | Germany . |
| 1207935B | 1/1989 | Italy . |
| 49-036929 | 10/1974 | Japan . |
| 58-206663 | 12/1983 | Japan . |
| 2-59416 | 8/1988 | Japan . |
| 1036631 | 2/1989 | Japan . |
| 1294751 | 11/1989 | Japan . |
| 2118423 | 5/1990 | Japan . |
| 2-190013 | 8/1990 | Japan . |
| 4-147923 | 5/1992 | Japan . |
| 5170986 | 7/1993 | Japan . |
| 353399 | 9/1972 | U.S.S.R. . |
| 1654272 | 6/1991 | U.S.S.R. . |
| 1654273 | 6/1991 | U.S.S.R. . |
| 1514010 | 6/1978 | United Kingdom . |
| 2017677B | 10/1979 | United Kingdom . |
| 2133787 | 8/1984 | United Kingdom . |
| 2178024 | 2/1987 | United Kingdom . |
| 2248834 | 4/1992 | United Kingdom . |

OTHER PUBLICATIONS

American Geological Institute, *Glossary of Geology*, 4th printing, pp. 16, 447, 543 and 796, Falls Church, VA, 1977.

American Petroleum Institute, *Recommended Practices for Testing High Strength Proppants Used in Hydraulic Fracturing Operations*, p. 12, Washington, D.C. 1989.

Beck, W.R., Minnesota Mining & Manufacturing Co., Record of Invention No. 5, "Glass Beads from Crystals," dated Jun. 14, 1957, Dec. 18, 1957 and Dec. 23, 1957, and notarized Dec. 23, 1957.

Bennett, H., F.A.I.C., *Concise Chemical and Technical Dictionary*, 3rd Edition, pp. 460, 1135–1136, Chemical Publishing Co., Inc., New York, N.Y.

Deer, W.A. et al, *An Introduction to the Rock–Forming Minerals*, pp. 140–143, 356–365, 282–338, Longman Group Limited, London, 1975.

Hurlbut, C.S., *Dana's Manual of Minerology*, 18th Ed., p. 460, John Wiley and Sons, Inc., New York, N.Y., 1971.

(List continued on next page.)

*Primary Examiner*—Peter A. Szekely

[57] ABSTRACT

The disclosure describes a method for producing bulk, particulate material that includes solid, generally ellipsoidal particles by dispersing irregularly shaped feed particles including about 60 to 100% by weight of at least one silicate-containing material selected from among wollastonite, alkali feldspar, plagioclase feldspar and nepheline. While maintaining the feed particles in dispersion, they are heated sufficiently to bring about at least partial fusion within at least the surfaces of the particles. This produces a bulk particulate product of which about 15 to 100% by volume is generally ellipsoidal particles. Also described are compositions of matter including solid particles, at least a portion of which are substantially glassy and generally ellipsoidal. At least a portion of these particles have been respectively formed from feed particles composed substantially of at least one silicate selected from among wollastonite, alkali feldspar, plagioclase feldspar and nepheline. The bulk particulate compositions contain about 15 to 100% by volume of the substantially glassy, generally ellipsoidal particles that are products of at least partial fusion of such feed particles.

53 Claims, 4 Drawing Sheets

OTHER PUBLICATIONS

Hutchinson, C. S., *Laboratory Handbook of Petrographic Techniques*, pp. 1, 15–16, 44, 47, 73, 113, 132, 180, 235, 247, 264, 333, 354, 374, 375, 414–425, 438, John Wiley and Sons, Inc., New York, N.Y., 1974.

Kirk–Othmer, *Concise Chemical and Technical Dictionary*, 3rd Ed., pp. 236–237; 1280–1282, "Ceramics" and Zirconium and Zirconium Compounds.

Reed, R. J., *North American Combustion Handbook*, 2nd Ed., p. 432, North American Mfg. Company, Cleveland, OH 1978.

Zeelan Industries, Inc., "What to expect when you include ZEEOSPHERES® In Your Paints and Coatings.", St. Paul, Mn., 1989.

*Budov et al, *Glass and Ceramics*, vol. 50, No. 7, pp. 275–279, XP000441844, "Glass Microbeads, Applications, Properties, and Technology," New York, NY, Jul. 1993.

*Chemical Abstracts, vol. 100, 1984, p. 302, 100:14402W, Expansion of Perlite, Stockman, Bernard, French Pat. 2,629,879, Jul. 12, 1982.

6001 Chemical Abstracts, Vo. 102 (1985) May, No. 20, Columbus, Ohio, USA, pp. 138–139.

International Search Report, PCT/US95/04985, 2 Aug., 1995.

*Kadey, F. L., Jr., *Industrial Minerals and Rocks*, 5th Edition, vol. 2,, "Perlite," pp. 997–1010, Society of Mining Engineers of the American Institue of Mining, Metallurgical, and Petroluem Engineers, Inc., New York, NY, 1983.

*Kansas Minerals, Inc., Product Brochure, "KAMCO™ Filteraids —Fillers —Micro Silica Beads," undated.

*Katz, H.S. et al, *Handbook of Fillers and Reinforcements for Plastics*, Van Nostrand Reinhold Company, New York, N.Y. 1978, pp. *66–78, *127–135, 301–316, * 441 and *450.

Keith, M. L., *Bulletin of the Geological Society of America*, vol. 50, (12 part 1), pp. 1795–1826, "Petrology of the Alkaline Intrusive at Blue Mountain" (Dec. 1939).

*Lange, N. A., *Handbook of Chemistry*, "Properties of Minerals, Penfield's Scale of Fusibility," pp. 166–167, McGraw–Hill Book Company, New York, N.Y. 1956.

Lefond, S. J., *Industrial Minerals and Rocks*, 5th Ed., Vols. 1 and 2, Society of Mining Engineers, pp. 709–722, 931–960, 1383–1390, New York, N.Y. 1983.

Plueddemann, E. P, *Silane Coupling Agents, 2nd Ed., Plenum Press, 1991*.

*Protasova et al, *Glass and Ceramics*, vol. 50, No. 7, pp. 342–344, XP000441852, "Use of Local Raw Material in the Glass Industry," New York, NY, Jul. 1993.

Taggart, A.F., *Handbook of Mineral Dressing*, pp. 118–120, John W. Wiley and Sons, Inc., New York, N.Y. 1945.

COMPOSITIONS COMPRISING FUSED PARTICULATES AND METHODS OF MAKING SAME

This application is a continuation of Ser. No. 08/231,937 filed on Apr. 25, 1994 now abandoned.

TECHNICAL FIELD

The present invention relates to compositions comprising at least partly fused particulates that are substantially glassy, and to methods for producing them. More particularly, the invention relates to generally ellipsoidal particulates formed by at least partial fusion from mineral particles containing one or more designated minerals, that is, from silicate-containing mineral materials selected from among wollastonite, alkali feldspar, plagioclase feldspar and nepheline, including combinations of the designated minerals with each other and/or with other materials.

BACKGROUND ART

Melting or softening of small particles under controlled conditions to convert them to generally ellipsoidal form is known. "Atomization," "fire polishing" and "direct fusion" techniques have been used.

Atomization methods involve first melting myriad raw material particles together to convert them to molten, i.e. bulk liquid, glass. Such bulk liquid typically contains far more than hundreds or thousands of times the amount of raw material required to make a single product particle. A thin stream of this molten glass is "atomized" by dropping it into a disruptive air jet, subdividing the stream into fine, molten droplets. The droplets are kept away from one another and from other objects until they have been cooled and solidified. Then they can be recovered as substantially discrete, generally ellipsoidal glass particles.

Describing atomization of glasses, Katz and Milewski, at page 303 of their "Handbook of Fillers and Reinforcements for Plastics," Van Nostrand Reinhold Company, New York, N.Y., 1978, explain that a glass batch, which initially includes crystalline materials, may contain sand, soda ash, dolomite, feldspar and other ingredients. When melted and thoroughly mixed so that the ingredients are no longer crystalline, the resultant bulk liquid material is then atomized. Glassy, amorphous, generally ellipsoidal particles are formed.

In fire-polishing, discrete solid particles of material having irregular shapes are heated to the softening or melting temperature of the material while suspended and dispersed in a hot gaseous medium. As particles become soft or molten, surface tension forms them into ellipsoidal shapes. If kept in suspension until cooled below the temperatures at which they "freeze" and become solid, the particles may then be recovered as generally discrete glassy ellipsoids.

Particulate feed materials for fire-polishing may be in the form of amorphous crushed glass solids when initially introduced into the gaseous medium. Thus, at page 302 of Katz and Milewski it is shown that particles of crushed and screened glass, such as plate glass, various glass cullets and bottle glass, all amorphous materials, may be suspended and dispersed in a hot gaseous medium and softened or melted to form them into ellipsoidal shapes.

Direct fusion bears some resemblance to fire-polishing. Feed particles with irregular shapes, including individual solid particles and/or adherent groups of such particles that are sometimes referred to as "clusters" or "agglomerates," are heated and softened or melted while in suspension and dispersion in a hot gaseous medium to form them into molten, generally ellipsoidal shapes, followed by cooling, freezing and recovery. Direct fusion draws its name in part from the fact that its feed particles directly undergo conversion to glassy or amorphous form in the ellipsoid-forming step, without prior conversion to bulk liquid form.

It is believed that a group of several mutually adherent feed particles, whether they become adherent prior to or during the ellipsoid-forming step, can melt and fuse to form a single, generally ellipsoidal particle of proportionately larger diameter. Thus, when these fused products are produced by direct fusion, whether they are formed from such groups of feed particles and/or from particles that remain discrete during fusion, the resulting generally ellipsoidal particles generally exhibit the varying average chemical compositions of the particles and/or groups of particles from which the ellipsoids are respectively formed, except that there may be relatively small losses of ingredients through high-temperature volatilization. Direct fusion products do not necessarily have the more uniformly similar particle-to-particle composition expected of particles produced from bulk liquid glass.

Atomization and fire polishing of glasses may be described as indirect methods. Their feed materials have been formulated from glass-making raw materials which were melted and homogenized in the form of bulk liquid prior to entering the ellipsoid-forming step. Consequently, in indirect methods, the individual chemical identities of the glass-making raw materials have been merged into an average composition which is uniformly present in the respective ellipsoids so produced.

Illustrations of direct fusion may be found in Japanese published patent applications HEI 2[1990] 59416 and HEI 2[1990] 199013, published respectively on Feb. 28, 1990 and Aug. 7, 1990. Therein, Morishita, et al and Shimada, et al respectively suggest fusing high purity silica particles with sizes measured in microns. The resultant products are for example useful as fillers in plastics.

Also, Klingaman and Ehrenreich, in U.S. Pat. Nos. 4,268,320 and 4,294,750, teach how to recover pyroplastoids, fused, substantially non-hollow alumino-silicate glassy ellipsoidal particles from fly ash found in the flue gases of coal fired boilers. These fused particles are also used as fillers in plastics, and for other purposes.

Ellipsoidal particles recovered from fly ash are generally economical, but can suffer from the disadvantage of containing colorants that are expensive if not virtually impossible to remove. Such colorants render these ellipsoids undesirable for certain end use applications.

Atomization processes can produce products comparatively free of undesirable colorants. However, these do not readily produce abundant quantities of some of the smaller particle sizes that are desired, for example particles smaller than 25 microns in average size.

Fire polishing of crushed or ground commercial glasses can be used to make very small particles having low color levels. However, the high cost of milling these amorphous materials to small sizes has contributed to the high cost of making small, uncolored particles by this route.

Direct fusion processes heretofore disclosed for converting crystalline silica to amorphous ellipsoids appear capable of producing white or transparent particles in very small sizes, but tend to be quite expensive due to the energy required to fuse these high-melting materials. It has been suggested that these processes be applied to broad categories of mineral materials, including alumino-silicates, metal silicates and other inorganic powders. However, whether this suggestion is practical, which of the myriad types and forms of raw materials available in these categories should be employed, and how this suggestion should be implemented to overcome the above difficulties, have yet to be made clear.

Thus, it is believed that a need remains for improvements in ellipsoidal fused particulate products, and in methods for producing them. The present invention seeks to fulfill this need.

DISCLOSURE OF THE INVENTION IN SUMMARY FORM

Fulfillment of this need has been accomplished in part by development of a method disclosed herein. It produces, in bulk, particulate material that includes solid, generally ellipsoidal particles. The method includes bringing into a dispersed condition irregularly shaped feed particles including about 60 to 100% by weight of at least one silicate-containing material selected from among wollastonite, alkali feldspar, plagioclase feldspar and nepheline. While maintaining the feed particles in dispersed condition, the feed particles are heated sufficiently to bring about at least partial fusion within at least the surfaces of the irregularly shaped particles. This produces a bulk particulate product in which about 15 to 100% by volume of the bulk particulate product is generally ellipsoidal particles.

The compositions of matter of the present invention comprise solid particles. In these compositions at least a portion of the particles are generally ellipsoidal particles that are substantially glassy. At least a portion of the particles respectively have chemical compositions corresponding substantially with that of material selected from among wollastonite, alkali feldspar, plagioclase feldspar and nepheline. The compositions of matter comprise about 15 to 100% by volume of said generally ellipsoidal particles that have said chemical compositions, based on the total volume of solid particles present in said compositions of matter.

ADVANTAGES

The invention, depending on which of its various embodiments is used, is expected to provide one or more of the advantages set forth in this and succeeding paragraphs. It should be understood therefore that the invention includes embodiments which possess less than all of the advantages described below.

It is an advantage of the invention that the designated minerals, partly because of their crystalline structure, can be ground easily to an average size as small as 3 microns, and, when mined from appropriate deposits, can readily be freed to the extent necessary or desired from certain of the accessory minerals with which they are found combined in nature, such as magnetite.

Another advantage of the invention is that these minerals can be efficiently melted in an "open" flame, without special confining furnace walls or flame quenching processes, to provide generally ellipsoidal particles which are only a few microns in average particle size. Among the preferred feed materials of the invention are those which, as described below, can have relatively low viscosity at temperatures slightly above their crystalline dissolution temperatures, whereby surface tension can readily form the particles, when melted or softened, into generally ellipsoidal shapes. As compared to silica, the designated minerals can have a significantly smaller temperature difference between their ellipsoid-forming and "melting" temperatures. In fact, the preferred minerals can be converted to generally ellipsoidal form in high yields in an open flame of natural gas and air, without unwanted agglomeration.

It is surprising that the above described minerals could be successfully "flash fused" in the above manner, at flame temperatures comparable to those used in so-called "indirect" processes, in which the feed material is a glass powder, as distinguished from these crystalline feed materials. For example, wollastonite is reported to have a melting point of 1540° C., which is at least about 400° above the working temperature at which most commercial glasses are fire-polished to ellipsoidal form.

Also, it was not apparent that an unconfined or open flame would have sufficient heat capacity to successfully convert substantial proportions of feed particles of the designated minerals to generally ellipsoidal shape at the relatively low, energy conserving temperatures, for example about 1000° to about 1900° C., that have been successfully used in the method of the present invention. Although it has been taught that dispersion of fine mineral particles in flames tends to extinguish them, due to lack of sufficient heat capacity in the flames, the method of the invention can be operated without undue difficulties.

While the inventor does not wish to be bound by any theory, it appears that the designated minerals may be fused with particular effectiveness when or as they contain substantial amounts of materials which cause them to deviate from their nominal chemical formulas, such as solid solutions, separate phases or small levels of ionic substitutions to be discussed in greater detail below. Those components of designated minerals that are responsible for such deviation may cause a lowering of feed particle melting points and working temperatures, as occurs in other crystalline materials which differ from their nominal composition.

It is also surprising that generally ellipsoidal products with specific gravities about 5 to about 15% lower than the specific gravities of the designated mineral feeds have been recovered. This provides an advantage of about 5 to about 15% both in manufacturing and in applications for the resultant powders.

A further advantage of the invention is the fact that the designated minerals can be converted to products of essentially the same particle size as the ground minerals used as feed materials for the fusion operation. More particularly, they can be readily converted to generally ellipsoidal particles under conditions that do not highly promote agglomeration of the product.

Another advantage of the invention is that the products can have higher temperature resistance than glass spheres manufactured by grinding and fusing various cullets, scrap window and bottle glasses and the like.

Products can be produced according to the invention for a wide variety of applications. For example, such products can be made in forms that are useful as film anti-blocking agents; as paint flatting agents; and as specialty powders useful in a wide variety of applications in thermosetting and thermoplastic resins such as silicones and fluoropolymers, in engineering plastics, in lotions and creams, and in composites, paper and other materials in any physical form, such as for instance molded products and single or multilayer products including especially webs and laminates. They also are useful in powder form as anti-caking aids, and as a powder with unusual "slip" or lubricity.

The advantages of these products flow in part from the chemical composition of the feed materials and resultant products, and from the generally ellipsoidal shaped particles present in the products. These advantages are especially apparent in those products, now made economically available, which have very small particle diameters.

When produced from preferred ores, the products are characterized by high levels of whiteness and transparency, relatively low cost as compared to other generally ellipsoidal glassy fillers of comparable size, whiteness and transparency, and high chemical inertness. Moreover, the products can have essentially the same whiteness as the feed materials used. It is believed that the present invention represents the most cost effective means known for directly manufacturing small-diameter, substantially non-hollow, generally ellipsoidal particles with a high degree of whiteness and transparency.

When produced in forms characterized by sufficient amounts of generally ellipsoidal particles, e.g. about 30 or more and up to 100% by volume based on the total volume of the solids contents of the compositions, the products may be used, even at relatively high concentrations, to form relatively low viscosity mixtures in liquids or molten plastics. Products that are abundant in generally ellipsoidal particles can have high levels of hardness coupled with low abrasiveness. Highly ellipsoidal products are also characterized by relatively low surface area and consequently engage in relatively little surface interaction with other materials with which they may be formulated in a variety of end use applications.

Products containing some particles having significant surface roughness may for example be employed to advantage in compositions where some degree of abrasiveness is desired. Fusion operations conducted according to the invention can be readily controlled to produce predetermined proportions of both substantially glassy and rough, irregular crystalline particles in the particulate product, which can thus be used to impart a predetermined degree of abrasiveness in end use applications. Such products are especially conserving of energy since much higher production rates per unit of fuel consumption can be attained where only partial conversion to ellipsoidal particles is required.

BRIEF DESCRIPTION OF THE DRAWINGS

A non-limiting embodiment of the invention, described in text which follows, is shown in accompanying illustrations, of which.

MODES FOR CARRYING OUT THE INVENTION

Figure 1:
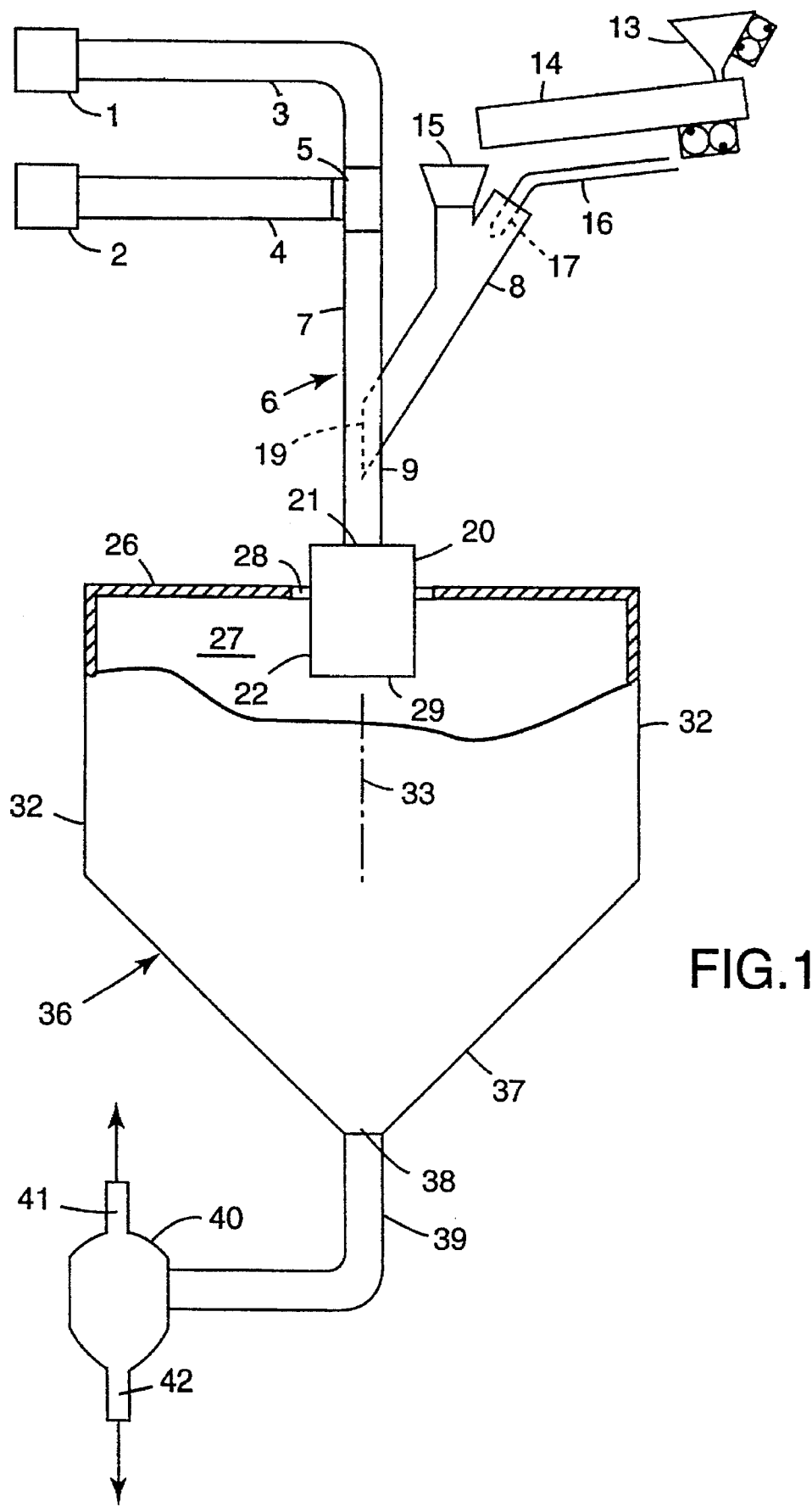
FIG. 1 is a schematic, overall diagram of apparatus for converting a feed material, such as that of FIG. 3, to a product of the present invention, an illustrative example of which is found in FIG. 4.

The raw materials used in the products and methods of the present invention are minerals, which are crystalline, and are available from naturally occurring sources. Known as wollastonite, alkali feldspar, plagioclase feldspar and nepheline, and individually or collectively referred to herein as "designated mineral(s)," these raw materials appear in nature as constituents of rocks of extremely varied mineralogical and chemical composition.

Wollastonite is a common mineral of metamorphosed impure limestones. The feldspars are present generally throughout the earth's crust. Nepheline is the most characteristic mineral of the alkaline rocks. Many if not most of the deposits in which the desired mineral materials may be found include a wide variety of other mineral materials in such large amounts as to render the contents of those deposits unsuitable for use in the present invention. However, there are a relatively small number of deposits in which the desired minerals are available in sufficiently unadulterated concentration so that they are useful, without prohibitively costly refining, in carrying out the present invention.

Preferred and suitable deposits and examples of ores which may be used in the present invention include: for wollastonite, Lewis and Willsboro, Essex County, N.Y., U.S.A. (preferred for its easy removal of accessory minerals, for its freedom from silica and for its brightness) and Harrisville, Lewis County, N.Y., U.S.A.; for alkali feldspar, Spruce Pine District of Avery, Mitchell and Yancey Counties, N.C., U.S.A. (preferred for its ability to be beneficiated to a low iron content, and for its extensive deposits) and Kings Mountain, Cleveland County, N.C., U.S.A.; for plagioclase feldspar, Spruce Pine District of Avery, Mitchell and Yancey Counties, N.C., U.S.A., Middletown, Conn., U.S.A. and Montpelier, Va., U.S.A.; and, for nepheline, Nephton and Blue Mountain, Ontario, Canada (preferred for its freedom from silica and for its easily removed magnetite) and Sternöy, Norway. Use of synthetic minerals in the invention, including especially synthetic wollastonites, is also contemplated. With the aid of the present disclosure, persons skilled in the art can select other suitable sources of the designated minerals.

Any of the known species of wollastonite, alkali feldspar, plagioclase feldspar and nepheline may be employed in the present invention. This includes all of the several available forms of crystalline structure in which each is available. It should also be noted that crystalline disorder and/or amorphous material may to some extent be present in these predominantly crystalline minerals.

Wollastonite is known to include at least three structural types of $CaSiO_3$. These three, that are known as wollastonite, pseudowollastonite and parawollastonite, are all useful in the invention. The term wollastonite, as used herein, whether rendered in the singular or plural, includes any one of these three types and any combination of the three. To distinguish the individual material called wollastonite from the general term wollastonite as defined above, that material may be referred to as "wollastonite per se." In the three forms mentioned above, the wollastonites have fibrous structures attributable to their containing chains of linked $SiO_4$ tetrahedra of the composition $(SiO_3)_n$.

Alkali feldspar is a family of feldspars that respectively include potassium feldspar ($KAlSi_3O_8$) alone or in combination in varying ratios with sodium feldspar ($NaAlSi_3O_8$). With respect to available ratios, see for example *Dana's Manual of Mineralogy*, 18th Ed., Hurlbut, C. S., John Wiley & Sons, Inc., New York, 1971, FIG. 421, p. 460. Alkali feldspar may also contain varying but usually small amounts of calcium feldspar ($CaAl_2Si_2O_8$). Examples of alkali feldspar include microcline, orthoclase, sanidine, adularia, albite, perthite and anorthoclase. The term alkali feldspar, as used herein, whether in the singular or plural, means any one or combination of these and/or other materials in the alkali feldspar family.

Plagioclase feldspar is a series of materials comprising calcium feldspar ($CaAl_2Si_2O_8$) alone or in combination in any ratio with sodium feldspar ($NaAlSi_3O_8$), and may contain varying amounts, but usually small amounts, such as about 20% by weight or less, of potassium feldspar ($KAlSi_3O_8$). Examples of plagioclase feldspar include albite, oligoclase, andesine, labradorite, bytownite and anorthite, and the term plagioclase feldspar, when used herein in the singular or plural, means any one or combination of these and/or other materials in the plagioclase feldspar family.

A portion of the alkali and plagioclase feldspars are members of the ternary system $NaAlSi_3O_8$—$KAlSi_3O_8$—$CaAl_2Si_2O_8$. Thus, the terms alkali feldspar and plagioclase feldspar include the full range of solid solutions of these three components which can exist in ores that can be mined. Among these are feldspars containing mostly sodium feldspar in solid solution with equal or nearly equal small quantities of potassium feldspar and calcium feldspar, for example, albite and some forms of anorthoclase. See *An Introduction to the Rock-Forming Minerals*, W. A. Deer et al, Longman Group Limited, London, 1975, p. 282, FIG. 91. This has caused some works to use albite to refer to solid solutions whose compositions fall at or near, and on either side of, the boundary between alkali feldspar and plagioclase feldspar, sometimes also referred to merely as plagioclase. See *Glossary of Geology*, American Geological Institute, Falls Church, Va., 1977, pp. 16 and 543.

In the present disclosure, the singular or plural term "nepheline" refers to any one or combination of the members of the nepheline group, of which at least two are known. These include nepheline itself ($Na_3(Na,K)[Al_4Si_4O_{16}]$) and kalsilite ($K[AlSiO_4]$), in all of their crystalline structures and solid solutions with each other. The nephelines typically occur in nature in combination with the alkali feldspars, with which the nephelines are capable of forming solid solutions of varying composition. Thus, while in principle there is no reason why the invention may not be practiced with one or more nephelines alone, it is contemplated that the nephelines will often be used in combination with alkali feldspar and/or with other accessory minerals, for example as nepheline syenite.

The contents of the relatively pure or concentrated forms of these minerals that are employed in the present invention often do not correspond identically to their respective chemical formulas. Some of the factors which cause such deviation, as well as some illustrations thereof that are by no means exhaustive, are described below.

One factor which can cause such deviation is the presence of slight differences between the ratios of atoms in the formulas and the ratios in which those atoms actually combine with one another when forming the mineral material. For example, many if not most nephelines found in nature contain more silicon and less aluminum than is represented by their respective formulas. The excess Si, calculated as $SiO_2$, may be as much as 6% by weight. Yet, this $SiO_2$ content is not typically included in the chemical formulas of the nephelines.

Another source of deviation is substitution. This is a process by which relatively small proportions of certain of the atoms predominantly or originally present in the crystalline lattices have been replaced with or supplanted by small amounts of other atoms not included in the formulas, either through naturally-occurring or synthetic processes. As an illustration, although fairly pure wollastonite ($CaSiO_3$) can be found in nature, wollastonite can by substitution accept considerable amounts of Fe and Mn atoms as replacements for Ca, but the formulas for the wollastonites do not reflect this. Moreover, Ba is present in the great majority of feldspars found in nature and feldspars containing up to about 5% by weight of Barium could be used in the invention. However, when present only in smaller quantities, e.g. up to about 2% by weight, Ba is not typically included in the chemical formulas of the feldspars.

A designated mineral may also deviate from its nominal formula by virtue of the fact that the designated mineral may be furnished in a form that contains relatively small amounts of one or more other minerals in solid solution with the designated mineral. For example, solid solutions of up to about 2% each of $SiO_2$, $Al_2O_3$, $Na_2O$, $K_2O$, $TiO_2$ and CaO can be present in most of the designated minerals, but these are not revealed in the formulas for these minerals.

The designated minerals also usually contain a small amount of materials that are given off or lost on strong heating, also called "ignition." These deviants are referred to as "loss on ignition" materials. Loss on ignition materials often represent up to about 2% by weight of the mineral and in many if not most cases include mostly adsorbed water which is driven off by heating. However, carbon dioxide, sulfur dioxide and organic residues are examples of other loss on ignition materials that may be present and that are not reflected in the formulas for the designated minerals.

Still another kind of deviation can result from the producer or processor adding chemicals to the mineral(s) in small amounts, e.g. up to about 5% by weight. To illustrate, this may be done to favorably influence the production process or modify the product. Examples include the addition of one or more milling or grinding additives and/or additives which may assist in the storage, conveying, or processing of the designated minerals. Another example is "treating" the mineral material with a sodium compound to add sodium ion and introduce additional sodium atoms into the mineral to reduce the melting temperature of the mineral and promote fusion. The terms wollastonite, alkali feldspar, plagioclase feldspar and nepheline, as employed herein, are therefore intended to include man-made modifications of the naturally occurring materials.

The above deviations from nominal formulas, other deviations described in illustrative literature such as Deer, et al, supra, and still other suitable deviations, including other additions to or modifications of the minerals which do not render the deviant materials unsuitable for use in the present invention, will not remove the materials in question from the families of wollastonite, alkali feldspar, plagioclase feldspar and nepheline minerals as defined herein. It is for these reasons that identification of these minerals by their names is preferred herein as compared to identifications based on their chemical formulas. Thus, subject to such minor adjustments in their meaning as are described herein, the present disclosure utilizes the art-recognized nomenclature of these materials. Chemical formulas are given herein only for convenience and not to limit the invention.

The chemical compositions of the designated alkali feldspar, plagioclase feldspar and nepheline minerals can for instance include on a weight percent basis: about 38 to about 70% of $SiO_2$; about 18 to about 37% of $Al_2O_3$; up to about 2% iron oxide (typically reported as $Fe_2O_3$ or FeO); up to about 29% $Na_2O$ and/or $K_2O$; and may also include small percentages of MgO and $Li_2O$, up to about 2% of each, and of BaO, up to about 5%. Preferred plagioclase feldspars contain about 3% or more of alkali metal oxides for decreasing their melting temperatures. Wollastonite mineral can for instance include on a weight basis: about 47 to about 55% $SiO_2$; about 38 to about 48% CaO; up to about 10% iron oxides; and up to about 1% of alkali metal oxides. Usually, very little $Al_2O_3$ is present in wollastonite. As used in the present disclosure, the expression "up to" is intended to include the presence of insignificant amounts, trace amounts, unmeasurable amounts and the complete absence of the materials referred to thereby.

When other minerals are present in admixture with rather than chemically combined or in solid solution with a designated mineral as found in nature, they are referred to as "accessory minerals." Examples of accessory minerals found in the designated minerals include: quartz, garnet, diopside, tremolite, idocrase, epidote, feldspar, graphite and calcite (in the case of wollastonite); quartz, muscovite, sphene, zircon, hornblende, magnetite, hematite, garnet and tourmaline (in the case of alkali feldspars); ilmenite, sericite, spinel, zircon, hornblende, magnetite, hematite, garnet, biotite and quartz (in the case of plagioclase feldspars); albite, microcline, biotite, hornblende, pyroxene, magnetite, calcite, muscovite, analcite, sodalite, cancrinite, garnet, zircon, corundum, scapolite, apatite and sphene (in the case of nepheline); and magnetite, ilmenite, calcite, garnet, zircon and corundum (in the case of nepheline syenite). Nepheline syenites are generally quartz free and usually contain at least about 20% nepheline, at least about 60% feldspar and up to about 5% accessory minerals.

The identity and mineral classification of the designated minerals and accessory minerals can be determined with standard petrographic analytical techniques, for example those described in the *Laboratory Handbook of Petrographic Techniques*, by C. S. Hutchison, John Wiley & Sons, Inc., 1974. With such techniques one can determine the presence of designated mineral phases by one or more of the following: X-ray diffraction patterns; determinations of chemical composition; microscopic observation; measurements of refractive index and density; calculations of the Niggli Molecular Norm (Catanorm); and differential solubility and differential staining techniques. See also *American Mineralogy*, "The Rosiwal method and the modal determination of rock," by E. S. Larsen and F. S. Miller, Vol. 20, p. 260, 1935. Many other accepted techniques and refinements are known to those skilled in the art.

Specific examples of preferred and suitable commercially available forms of the designated minerals for use in the invention include the following: "NYAD® 325," "NYAD® 400," "NYAD® 475" and "NYAD® 1250" powders (containing about 98% wollastonite) available from NYCO® Minerals, Inc. with average particle diameters of about 13, 11, 8 and 4 microns, respectively; "Felex C-325," "Felex 40," "Felex 20," "Felex 10" and "NC-4" alkali feldspar powders (about 60% albite, 22% orthoclase and 8% anorthite, together with 10% quartz as an accessory mineral) available from The Feldspar Corporation with average particle diameters of about 7, 7, 4, 3 and 14 microns, respectively; "K-200" alkali feldspar powder (containing about 62% orthoclase, 29% albite and 1% anorthite, together with 7% quartz as an accessory mineral) available from The Feldspar Corporation with an average particle size of 13 microns; "SIL-O-SPAR" alkali feldspar powder (containing about 46% albite, 18% orthoclase and 5% anorthite, together with 1% wollastonite and 30% quartz as accessory minerals) available from The Feldspar Corporation with an average particle size of 16 microns; "G-200" alkali feldspar powder (containing about 62% orthoclase, 27% albite and 4% anorthite, together with 6% of quartz and 0.08% of hematite as accessory minerals) available from The Feldspar Corporation with an average particle size of about 13 microns; "Aplite" plagioclase feldspar powder (containing about 52% albite, 25% anorthite and 15% orthoclase, together with 8% quartz and 0.1% hematite as accessory minerals) available from the U.S. Silica Company with an average particle size of about 300 microns; and MINEX™ 4, MINEX™ 7 and MINEX™ 10 powders (containing about 70% albite and orthoclase alkali feldspars and 28% nepheline) available from Unimin Specialty Minerals, Inc. with average particle diameters of about 9, 6 and 3 microns, respectively. Because the identities of the above mineral phases were determined by the Niggli Molecular Norm, which does not distinguish between orthoclase and microcline, some of the mineral phases identified above as orthoclase may actually be microcline.

The NYAD® wollastonite products are preferred for their freedom from crystalline silica and for their high brightness and refractive index. The NC-4, C-325 and "Felex" alkali feldspar products from the Feldspar Corporation are preferred for their high brightness, chemical inertness and abundant supply. The MINEX™ nepheline syenite products from Unimin Specialty Minerals, Inc. are preferred for their high brightness and freedom from silica. Additional reasons for preferring NC-4 and MINEX™ 10 are that they exhibit relatively low viscosity at temperatures slightly above their crystalline dissolution temperatures, whereby surface tension can readily form the particles, when melted or softened, into generally ellipsoidal shapes. All of these products are preferred by reason of their ready commercial availability in a particular size (average diameters of from about 3 microns up to about 15 microns are preferred), which may be used to produce a specific size of generally ellipsoidal product and meet particular application requirements, i.e. extenders and gloss control additives for paints, film anti-blocking additives and additives for thermoplastics.

Anorthite, due to its higher melting temperature, is preferably used in admixture with one or more other designated minerals of lower melting temperature. Thus, it is preferred to use anorthite as solid solutions, as a partial phase within particles, or as an agglomerate, together with one or more additional designated minerals of lower melting temperature selected from among the wollastonite, alkali feldspar, plagioclase feldspar and nepheline families. In such mixed particle compositions, the quantity of anorthite present is preferably up to about 70% by weight, based on the entire mineral content of the feed particles.

Wollastonite, alkali feldspar, plagioclase feldspar and nepheline ores, even when mined from the few deposits in which they may be found at relatively high concentrations, will often require some degree of refining to produce a process feed material composed substantially of one or more of the designated minerals. Among the materials which may be removed by such preparatory treatments are excess accessory minerals and materials which impart color to the ores.

Suitable preparation will in most if not all cases involve grinding not only to adjust particle size, but also to liberate some portion of the accessory minerals and/or other ore components which may be present. Thus, grinding will often be followed by magnetic separation and/or flotation to remove the liberated accessory minerals and/or other constituents.

Each of the designated minerals is obtainable in substantially "white," "colorless" or "bright" forms that can be converted to substantially white, colorless or bright generally ellipsoidal particles according to the present invention. For purposes of this invention, brightness of the feed and product particles in dry, packed powder form may be measured with a HunterLab Color Quest Spectrocolorimeter System, Model CQS-9400 45/0, or equivalent means, at 457 nanometers.

Feed materials used in the invention may for example have a Color Quest 457 nanometer brightness of at least about 60, more preferably at least about 70 and yet more preferably at least about 80. In general, the preferred mineral materials, used to produce white and/or transparent products with low color, contain very small amounts of $Fe_2O_3$ or $Fe_3O_4$, e.g. less than about 0.1%, and of FeO, e.g. less than about 1%. However, use of colored forms of the designated minerals and production of colored products are also contemplated.

A preferred method of preparation of wollastonite includes coarse grinding, followed by magnetic separation to remove iron containing minerals and final grinding and classification to provide one of several selected "final" particle sizes in which the wollastonite is commercially available. Preparation of the alkali feldspars, plagioclase feldspars and nepheline bearing minerals preferably includes coarse grinding, followed by magnetic separation of iron containing minerals and, if necessary, froth flotation to remove mica, silica and other accessory minerals. Final grinding and classification provide several commercially available particle sizes.

Preferred sizes for the feed material particles, and for the particles in the compositions of matter produced according to this invention, will be in the range of up to about 500 microns, with about 50 to 100% by volume of said particles having particle sizes in the range of about 1 to about 250, and more preferably about 1 to about 100, microns. Progressively more preferred ranges of average particle size include about 3 to about 250, about 3 to about 100, about 3 to about 50 and about 3 to about 25, microns.

In Japanese published patent application No. HEI 4 [1992]-147923, "Manufacturing Method of Spherical Microparticles (Kyujo biryushi no seizohoho)," by T. Koyama, et al, published May 21, 1992, the inventors suggest, apparently in the attempt to recover very small products, grinding the raw material to a particle size in the range of 0.1 to 1 micron. However, it appears that the fusion procedure used suffers from some considerable agglomeration of the molten or soft particles. One of the advantages of the present invention is that it makes possible the production of generally ellipsoidal particles in abundance while minimizing unwanted agglomeration. Accordingly, it is not necessary to grind the feed material to the 0.1 to 1 micron range. However, this relatively difficult and expensive mode of feed material preparation may be used in practicing the present invention if desired. For example, one may wish to obtain particularly small particles for use in making agglomerated feed material, which is described below. On the other hand, for some desired end uses of the products of the invention, discrete product particles essentially confined to the size range of 0.1 to 1 microns would be too small, although having some quantities of particles in this range will certainly be acceptable if not desirable in many of the end uses for the products of the present invention. Thus, in certain preferred embodiments of the invention, the feed particles have an average particle size by volume in excess of 1 and more preferably in excess of 2 microns.

The feed materials may be treated in various ways prior to the fusion operation. For example, according to Garnier et al in U.S. Pat. No. 4,778,502, it is beneficial, in production of hollow microspheres from particles of ground glass, to disperse over the surfaces of the amorphous glass particles a "fluidizing agent," e.g. a surfactant. It has been found that treatment of crystalline mineral feed materials with fluidizing agents is also beneficial in making substantially non-hollow particulates by the present invention, in that it tends to inhibit agglomeration or clumping of the feed material so that it will flow more smoothly through conveying and measuring devices upstream of the fusion operation, and possibly also tends to promote, to some extent, retention of particles in discrete form during the fusion operation.

The surfactants are agents having a good affinity for glass, thus including a polar part comprising for example hydroxyl or amino radicals and a non-polar part promoting the independence of the treated particles. Examples include the polyalkanol amines and monopropylene glycol. Triethanolamine has been used in practicing the present invention, and other surfactants could be employed. For additional examples, see Kopatz and Pruyne in U.S. Pat. No. 4,715,878, which describes additional anionic, cationic and non-ionic treatments which can be used in the present invention.

It is recommended that the fluidizing agent be added to the feed material during grinding of the latter, preferably as several additions during the grinding process. Such additions can be made as part of a final size reduction step in the preparation of the feed material. Intimate dispersion of triethanolamine over the particle surfaces has for instance been achieved by ball-milling the particles for about one hour with about 1% by weight of the surfactant, based on the total weight of mineral.

On the other hand, one can make multi-particle "agglomerates" that include designated mineral particles and that are useful as feed materials to be converted by fusion to compositions containing generally spheroidal particles referred to as "conglomerate" particles or products. Such use of agglomerates herein is an adaptation of the teachings of Tung and Beck in U.S. Pat. No. 3,493,403. They fuse powders containing clusters of mixed metal oxide particles to make generally ellipsoidal particles.

According to the present invention, agglomerates may be formed from particles of one or more designated minerals, with or without particles of other materials being included. Inclusion of particles of other materials that are sufficiently small, e.g. up to an average of about 10 microns, makes it possible, depending on their melting points and composition, to produce conglomerates comprising generally ellipsoidal particles whose chemical compositions represent at least a partial blend of the different materials included in the agglomerates. Use of this technique affords opportunities to make conglomerates with widely varying compositions and properties to meet the requirements of a wide variety of end uses.

Among the types of "other materials" which may be included in the agglomerates are any synthetically produced and/or naturally occurring mineral and non-mineral materials, such as accessory minerals and other materials eligible for inclusion in the "remainder" of the feed material, as defined below. This is true whether or not such other materials are mined or produced along with or separately from the designated mineral(s) present in the agglomerates. Specific non-limiting examples of these other materials include quartz, diatomaceous earths, precipitated or fumed silicas, clays, inorganic pigments such as $TiO_2$, powdered glass and other powdered metal oxides and minerals. These materials are preferably in the form of powders having average particle sizes of up to about 10 microns.

Included in the foregoing agglomeration procedures is the concept of providing the designated mineral(s) with a "synthetic" or "adjusted" accessory mineral content. Thus, it is possible to adjust the amount and kind of accessory minerals associated with a given designated mineral in the feed material and in the resultant conglomerate product. For example, one can agglomerate a given naturally occurring mineral with one or more synthetic or naturally occurring minerals that are and/or are not found associated with the given mineral in the deposit from which it is mined.

Agglomerates may be formed subsequent to the above-described milling and classification operations, and prior to the fusion step. To render particles adherent for agglomeration, one may employ any suitable means, including for instance a sintering process and/or binder(s), for example organic and/or inorganic binder(s). Illustrative binders include polyvinyl alcohols, starches, soluble silicates and numerous others, such as those that have been used in making prills of fertilizers, iron ore and other "pelletized" products. Some of the materials useful herein as binders include those, such as lignin sulfonates, which may in other contexts act as dispersants.

If agglomerated particles of a predetermined, desired size are not obtained directly upon formation of the agglomerates, they may be provided in any suitable manner, such as by breaking up of oversized agglomerates and/or by size classification with screens, air classifiers or other means. When exposed to direct fusion conditions, such agglomerates are converted at least in part to generally ellipsoidal product particles whose respective sizes are proportional to the number and sizes of the particles that were present in the agglomerate.

The other materials mentioned above as candidates for use in preparing agglomerates, as well as other materials not mentioned, may be present in the feed material with or without the above-mentioned fluidizing agents, sintering treatments and/or binders. Thus, it is contemplated that such other materials may represent simple, unagglomerated additions to or dilutions of the feed material.

While the feed materials utilized in the present invention do not necessarily contain only wollastonite, alkali feldspar, plagioclase feldspar and/or nepheline, they are nevertheless "composed substantially of" at least one of these crystalline materials in any of their crystal and composition modifications. Thus, the feed materials contemplated for use in the present invention may contain about 60 to 100%, more specifically about 75 to 100% and still more specifically about 90 to 100% by weight of one or more of the designated crystalline minerals. These ranges include the materials embraced by the above-mentioned definitions of the designated minerals. Thus, for example, these ranges generally embrace those materials which cause the above-described deviations of the designated minerals from their nominal chemical formulas. Among these are: excesses of one or more of the atoms that are included in such formulas; atomic substitutions, i.e. atoms that are not included in such formulas and that have been substituted for included atoms; solid solutions; and such other components of, additions to or modifications of the designated minerals which do not render them unsuitable for use in the present invention, including without limitation man-made modifications of the naturally occurring materials. However, the loss on ignition materials, although usually present in the feed materials or at least in the raw materials from which they are prepared, are not to be counted either as part of the designated minerals or included in the basis for applying the above weight percentage ranges.

The expression "composed substantially of" and the weight ranges just given are intended to indicate that the feed materials may correspondingly and respectively contain up to about 40%, more specifically up to about 25% and still more specifically up to about 10% by weight of "remainder" materials. Remainder materials may for example include accessory minerals, the above fluidizing or agglomerating agents and any other material or materials which may be present in the feed material without making it unfit for making products that contain at least about 15% of, and preferably at least about 30% of, at least partially fused generally ellipsoidal particles, such as may be useful in one or more of the end-use applications disclosed herein or in another end use.

It is preferred that from a major portion up to substantially all of the feed particles respectively contain about 60% to 100% by weight of one or more of the designated minerals. Thus, for example, about 50 to 100%, more preferably about 75 to 100% and still more preferably about 90 to 100% by weight of the feed particles will respectively contain about 60 to 100% by weight of designated mineral(s). Thus, it is contemplated that one can formulate feed materials in which there are feed particles that respectively contain above and below 60% by weight of the designated mineral(s), including for example feed materials in which more than 50% by weight of the feed particles contain less than 60% by weight of designated mineral(s), but in which the weighted average composition of the feed particles reflects about 60 to 100% by weight of designated mineral(s). Correspondingly, one can formulate feed materials in which there are feed particles that respectively contain above and below 40% by weight of remainder material(s), but in which the weighted average composition of the feed particles reflects up to about 40% by weight of remainder material(s).

According to the invention, at least partially fused particulate material is prepared from feed particles containing designated mineral, which may be prepared as above described or in any other suitable manner. The term particle is used herein in a generic sense that includes any finely subdivided form of the particular mineral involved, which may for example include grains, crystals, mixtures of crystals, mixed crystals, clusters, agglomerates and fiber fragments.

Particularly preferred products of the invention are characterized by having chemical compositions corresponding substantially with that of one or more materials selected from among wollastonite, alkali feldspar, plagioclase feldspar and nepheline, including mixtures thereof. The terminology "corresponding substantially with" is intended to embrace chemical compositions similar to those which would result from at least partial fusion of feed material composed substantially of at least one of the designated materials. However, the words corresponding substantially with have been chosen to embrace the possibilities that different production techniques can be employed and that there can be differences between the chemical compositions of the feed materials and those of the resultant products. For example, differences between feed material and product chemical compositions can result from departure of the loss on ignition materials and of varying amounts of other portions of the minerals as a result of high temperature volatilization, such other portions usually being in the range of up to about 5% by weight of the feed material.

The products of the present invention may be produced in any suitable manner. For example, atomization and direct fusion methods may be used.

Thus, one may melt feed particles composed substantially of one or a mixture of the designated minerals to form a batch of bulk liquid glass. The bulk liquid so prepared may then be formed by atomization into a glassy product comprising generally ellipsoidal particles. The chemical composition of these particles will ordinarily be uniform from one particle to the next and correspond substantially with that of the bulk liquid glass.

In certain circumstances, when practicing atomization with mixtures involving the designated minerals, persons skilled in the art may prefer to use only mixtures that avoid the development of insoluble phases. However, it should be noted that atomization of liquids that contain immiscible phases or that are unstable with respect to crystallization can theoretically lead to products comprising multi-phase particles and/or particles exhibiting a degree of crystallization, depending on the rate of particle cooling. Such atomization products are within the scope of the present invention.

Nevertheless, the preferred technique for forming the products of the invention is direct fusion. This method of formation makes powders in which the constituent particles have particle-to-particle variations in chemical composition and residual crystallinity of a kind not found in particles made by indirect methods.

The term direct fusion is used in a broad sense to include any method by which irregularly shaped feed particles composed substantially of one or more of the designated minerals may be dispersed, heated and melted or softened sufficiently to convert them while dispersed, under the influence of surface tension, to generally ellipsoidal particles. This includes methods in which the primary source of heat transferred to the feed particles is a source other than a gas in which the dispersed particles are dispersed. For example, it has been suggested in the prior art to heat a flow of feed material by surrounding it with, but segregating it from, a curtain of high emissivity gases or particles, such as burning coal particles.

However, it is preferred that heat to at least partly fuse the feed particles be transferred to them by contact with a hot gas in which they are dispersed. Thus, it is contemplated that at least a portion if not all of the heat required for at least partial fusion of the particles may be transferred to them by dispersing them as a fluidized bed in hot gases. The fluidized bed may for example be used to preheat and pre-disperse the particles, which may then be transferred to other equipment to complete their heating and fusion.

The hot gas may be heated in any suitable manner. For example, the hot gas may be one which has been heated, such as by combustion, and in which combustion has been completed, prior to the gas coming into contact with the feed. More preferably, in pre-heating and/or in a subsequent fusion step, heat is transferred to the feed particles through contact with flaming combustion gases. Prior art, for example the above-identified Koyama Japanese published patent application, appears to suggest that particles may be fused by injecting them into an already-ignited flame. Other prior art has suggested that fusion may be performed with a plasma in a flame-spraying apparatus.

Thus, the particles of feed material are preferably maintained in a dispersed condition in a flaming air-gas mixture during at least a portion of the fusion step. During their residence in the flame, and possibly during continued contact with the hot combustion gases outside the flame, the particles are maintained for a time at a temperature sufficient to soften or melt them to the extent that surface tension within the resultant fused or partially fused particles or droplets is sufficient to convert appreciable amounts of the feed particles to generally ellipsoidal form.

However, the most preferred method is to premix and entrain feed particles in flowing combustible gases and heat them to fusion temperature by igniting the gases in the presence of the particles and maintaining the particles in a dispersed state in the flaming gases and possibly also for some distance downstream of the flame. The flow of particles as they progress from their original un-fused state to an at least partially fused state may be in any appropriate direction or directions, including for example horizontal and/or vertical, with vertical down-flow being preferred.

Combustible gas mixtures may, for example, employ as fuel carbonaceous gases such as carbon monoxide and/or hydrocarbons. The latter include hydrocarbon fuels that are liquids or semi-solids at ambient conditions (20° C. and atmospheric pressure) but that can exist substantially in vapor format the conditions under which they are mixed with feed particles. Preferably, the hydrocarbon fuels are those that are gases at ambient conditions, including for example acetylene and particularly those hydrocarbon fuels in which the hydrogen to carbon mole ratio is about 2.5 or more. This includes for example butane, propane, ethane and methane, e.g. in the form of natural gas.

As oxygen-containing gas one may use substantially pure oxygen, oxygen enriched air or unenriched air as drawn from the atmosphere, it being an advantage of the invention that suitable oxygen-containing gases may be used that have nitrogen contents in the range of about 50 to about 80 mole percent, the balance being primarily oxygen.

The combustion supporting gases are preferably substantially free of sources of cinders, including ash and carbon particles. However, the presence of very fine, clean burning, particles of carbon and solid carbonaceous fuels is acceptable.

Preheating of the fuel, air, oxygen enriched air and feed particles generally increases productivity and decreases the time of contact between the feed particles and the combustion gases required to at least partially fuse the particles. These modes of improving heat input are especially helpful in fusing larger particles, e.g. 100 microns and greater, since their larger size requires a higher rate of heat transfer to bring them to the required fusion temperature within a given residence time in the combustion zone. Preheating of the feed particles can also assist in "conditioning" the materials by removing surface moisture or electrostatic charges and thereby provide improved dispersion into the combustion gases.

Using a sensible flame temperature of, for example, about 1900° to about 2100° C., which will readily process wollastonite but not silica, particle temperatures may be raised to within the range of about 1000° to about 1900°, preferably about 1100° to about 1700° and still more preferably about 1200° to about 1700° C. The designated minerals are reported to melt at temperatures in the range of about 1000° to about 1550° C. In practicing the invention, lower melting temperatures than those reported may be obtained in a number of ways, such as by using in the feed materials the above specific examples of preferred and suitable commercially available forms of the designated minerals and/or by surface treatments, all as above described.

The mass of particles produced per 1000 B.T.U. released by the fuel can be in the range of about 0.01 to about 1 pound. However, it is known, as reflected in the teachings of U.S. Pat. No. 2,044,680 to C. G. Gilbert, that the rate of heat absorption from burning gases by particles entrained therein varies inversely with the square of the particle diameter. Diminishing particle size increases the rate and total amount of heat absorption. Thus, in conducting fusion in an open flame, as the particle size of the feed material is progressively reduced, it may be advantageous to correspondingly reduce the feed concentration in the gases and/or increase heat production through use of more or hotter fuels, through preheating of the feed and/or the combustion gases, and/or through use of oxygen enriched air or even pure oxygen. By these measures, one can provide a sufficient rate of combustion and heat release so that the particles will not extinguish the flame in the fusion apparatus, and so that the intended percentage of particles will attain the required fusion temperature.

Differences between the melting or softening temperatures of different feed materials and the extent of conversion of feed to generally ellipsoidal particles will also require suitable adjustment of feed rate and/or heat input. An appropriate balance between feed particle size, melting or softening point and feed rate on the one hand and combustible gas composition and flow rate on the other, will be readily established by persons skilled in the art with the aid of this disclosure and without undue experimentation.

It is preferred that the particles be cooled rapidly after fusion has progressed to the desired extent. For example, when cooling products having glass transition temperatures of about 900° from a flame temperature of about 1200°, a cooling rate in excess of about 100°, more preferably in excess of about 200° or still more preferably in excess of about 300° per second is preferred. Radiant and convective cooling of the particles is preferably assisted by cooling air brought into contact with the fused particles with a minimum of turbulence. This minimizes the potential for accretions resulting from collisions of still-molten or still-soft particles with one another or with surfaces of the production apparatus.

The entire fusion operation may be performed in one step, with at least partial conversion of irregularly shaped crystalline feed particles to generally ellipsoidal form. Thus, for example, about 15 to 100%, more preferably about 50 to 100% and still more preferably about 75 to 100% by volume of the solids content of the compositions of the invention will be in the form of generally ellipsoidal particles. For certain applications in which it is important to minimize the quantity of irregularly shaped particles found in the product, the percentage of generally ellipsoidal particles may be in the range of about 90 to 100% based on the solids content of the compositions.

The desired products, containing any of the foregoing ranges of generally ellipsoidal products, may also be produced in multi-pass operations. This includes methods involving the recycling of partially fused product streams to the same burner through which they have previously passed one or more times, or the passing of partially fused streams of particles in sequence through two or more separate burners.

A preferred form of apparatus which has been employed to produce the products of the present invention using the method of the present invention, and which has also been used to conduct the examples set forth below, will now be described with the aid of the drawings. It should be understood however that such apparatus disclosure is illustrative only, and that the invention is not intended to be limited by or to the particular apparatus described.

Figure 2:
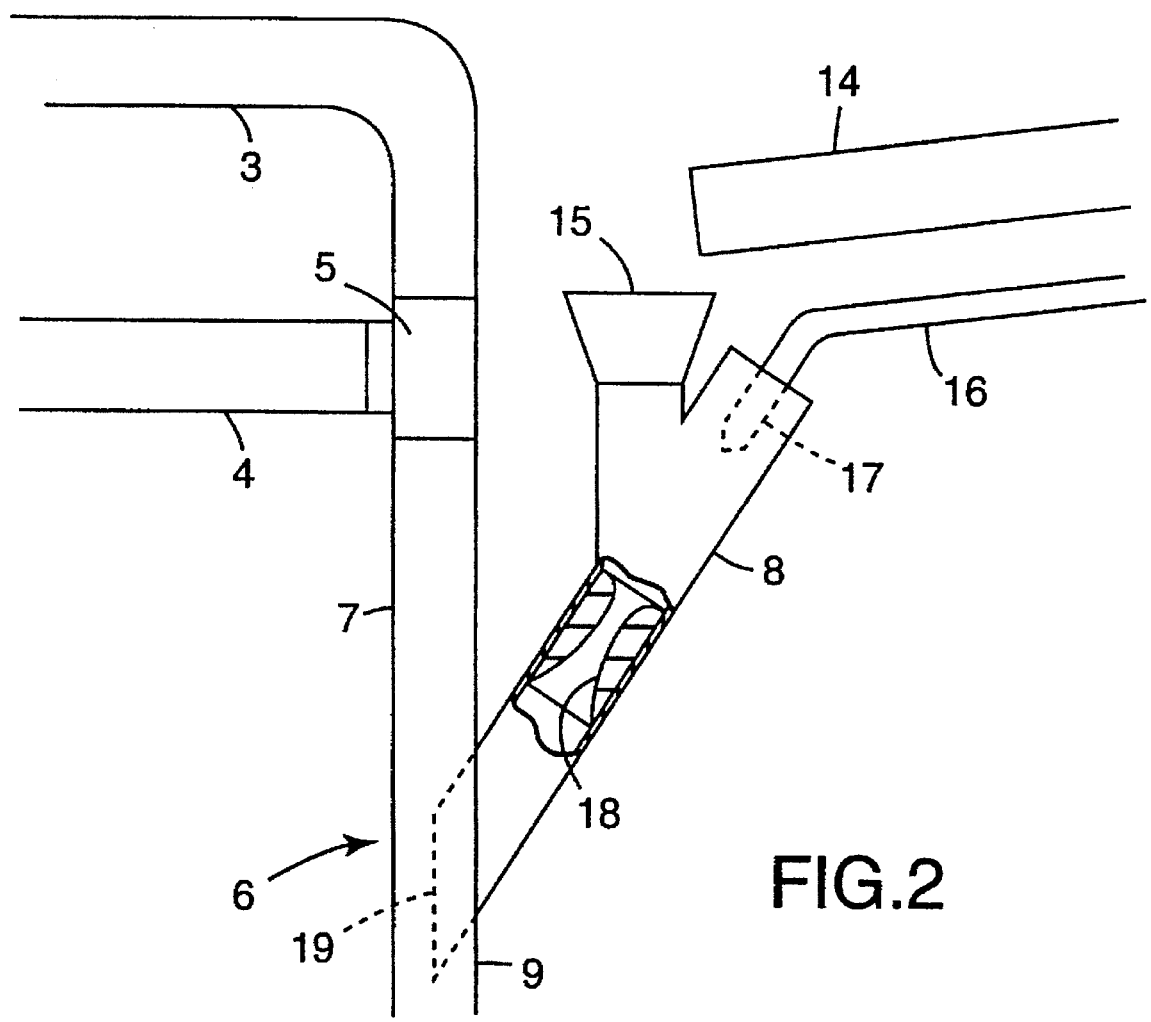
FIG. 2 is an enlarged portion of the apparatus of FIG. 1, disclosing a mixing device for assisting in dispersion of feed particles into a stream of combustible gases.

The illustrative equipment shown in FIGS. 1 and 2 includes separate sources 1 and 2 for oxygen-containing gas and fuel, which may or may not include facilities for pre-heating of the oxygen-containing gas and/or fuel. Thus, for example, filtered oxygen-containing gas is conducted from its source 1 through a suitable compressor or blower (not shown), valving (not shown) and flow measuring equipment (not shown) into oxygen-containing gas pipe 3 to provide an adjustable, stable flow of such oxygen-containing gas. Fuel gas, after passing from its source 2 through its own independent valving (not shown), flow measuring device (not shown) and delivery pipe 4 is adjustably drawn by aspiration and at a stable rate of flow into pipe 3 at junction 5. There, if needed or desired, a flow-control orifice is provided to properly match the volume of the fuel to the usually larger volume of oxygen-containing gas. For example where the oxygen-containing gas is air and the fuel is natural gas, a volume ratio of about 10:1 may be employed.

Pre-mixing of the resulting combustion-supporting gas mixture with feed material prior to igniting the fuel may be performed in a Y 6, a generally "Y"-shaped mixing connection having upper intersecting gas and feed entry legs 7 and 8 which join and feed together into a lower exit leg 9. Gas entry leg 7 is a vertically oriented extension of oxygen-containing gas pipe 3. Feed entry leg 8 also extends upwardly but is inclined from the vertical, intersecting at an acute angle, for example about 10°–45°, with gas entry leg 7.

A uniform rate of flow of feed into feed entry leg 8 is effected by feeding the feed under moderate humidity and temperature, e.g. at room temperature, from a vibrating discharge funnel 13 onto a vibratory conveyor 14 and from that conveyor into inlet 15 of the feed entry leg. Supply pipe 16 provides a supply of dispersion gas such as air, which may thus represent a small portion of the combustion-supporting gas to be burned. As shown in greater detail in FIG. 2, which is an enlarged, partial cross section of FIG. 1, dispersion gas discharged from supply pipe 16 passes through jet nozzle 17 into feed entry leg 8 to aspirate feed from inlet 15 into leg 8 and through venturi 18 to assist in dispersion of the feed particles. Particles of feed, pre-dispersed in dispersion gas, are delivered through chamfered end 19 of feed entry leg 8 into the intersection of Y 6, where they are then mixed with and further dispersed in the combustion gases passing downward through gas entry leg 7.

Dispersal of the feed in the combustion gases can be achieved and enhanced by selection of the ratio of gas to feed mixed in the Y and the volume rate of gas flow per unit of cross-section of the gas tube provided by the continuation of gas entry leg 7 into exit leg 9 of Y 6. In experiments conducted in the apparatus described herein, ratios in the range of about 0.9 to about 9 pounds of feed per 1000 ft.$^3$ (cubic feet at 15° C.) of fuel-air mixture were used. The combustible gas through-put was for example 400 ft.$^3$/hour through a gas tube having an area of about one square inch. Persons skilled in the art will appreciate that the ranges of ratios and velocities that will work in other types of equipment, and the ranges that will work to best advantage in such other equipment, may vary from the values just given and can be found through tests which such persons can readily conduct with the aid of this disclosure and without undue experimentation.

A variety of burners can be used to ignite the combustible gas mixture containing entrained feed particles. Examples may be found in *North American Combustion Handbook*, edited by Richard J. Reed, 2d Ed., North American Manufacturing Company, Cleveland, Ohio, U.S.A., 1978, the contents of which are hereby incorporated herein by reference. See also Soviet Union Patents Nos. 1,654,272 and 1,654,273 to Nosach, et al, both assigned to As UKR Thermo-Phys. Stekloplastik Prodn. Assoc. Persons skilled in the art, with the benefit of the present disclosure, will select or adapt such burners as necessary to facilitate their acceptance and transmission of combustible gas mixtures containing entrained feed particles, adjusting the sizes of passages and orifices as required to keep such particles in a dispersed condition and avoid clogging of the burner.

In the present preferred embodiment, as may be seen in FIG. 1, the burner 20 is a downwardly discharging "stick-tight" gas burner having a 1.75 inch diameter flame-retaining nozzle 22. Such a burner is described at page 431 of the above-mentioned Reed work. In the present embodiment, this burner has at its top a common inlet 21 for the particle and combustion-supporting gas mixture, received from exit leg 9 of Y 6.

Nozzle 22 of burner 20 penetrates the upper, horizontal wall 26 of a combustion chamber 27. An annular opening in wall 26 surrounding the outer, peripheral surface of nozzle 22 represents an inlet port 28 for cooling air. A short distance below this port, at the bottom of nozzle 22, is a generally horizontal burner mouth 29 for the discharge of combustible gas and entrained feed into combustion chamber 27. Combustion occurs as the particle-combustible gas mixture exits burner mouth 29 and continues downward in combustion chamber 27.

While it is possible to widely vary the internal cross-sections of the above-mentioned gas channel in the Y and of the burner, a certain balance between these dimensions should be maintained. The objective to be satisfied in selection of these dimensions is keeping feed particles dispersed in the resulting flame, while keeping sufficient velocity of flow through burner mouth 29, given the available volume rate of the gas and feed, to discourage or effectively bar "back-fire," retreat of the flame into the interior of burner 20. As those skilled in the art will appreciate, a variety of other burner designs are available which can accomplish these objectives.

It is believed beneficial to generate the flame from the burner in a "wall-free" environment. By this it is meant that the side walls 32 of combustion chamber 27 are positioned at a predetermined distance laterally or transversely from the path of the flame emanating from burner mouth 29. There should be a sufficient distance laterally or transversely from the perimeter of the flame to the walls 32 to afford the flame a substantial amount of freedom to expand in the lateral or transverse direction. Alternatively, this distance should be sufficient to substantially inhibit or substantially prevent molten or soft and still unsolidified particles that have been at least partially fused in the flame from contacting the side walls 32 and adhering thereto. Preferably, the distance should be sufficient both to afford the freedom to expand and to inhibit the adherence of particles, as above described.

In the present burner embodiment, burner mouth 29 is located on the extended axis 33 of the burner and projects a flame along that axis, generally in the direction in which the axis extends. Thus, in this case, the side walls 32 are positioned at a predetermined lateral or transverse distance from that axis, to provide the freedom and/or inhibition described above. The side walls 32 may be of any suitable configuration, but are cylindrical in the present embodiment, as viewed in a plane perpendicular to axis 33, and have a diameter of about 3 feet.

Prior art suggests introducing cooling gas to the combustion area, perpendicular to the path of the flame and presumably a short distance downstream from the burner. According to those teachings, the flame disappears where it contacts the cooling gas, and the technique could thus be used to control the amount of time during which feed particles are held at fusion temperature. That system may optionally be used with the present invention. However, the present invention also provides and preferably employs a different and advantageous cooling technique, as described below.

In connection with the present invention it has been found that assistance in isolating molten or soft particles from the combustion chamber side walls 32, and in some cases from the upper wall 26, can be obtained from a current of cooling gas, such as air introduced through the above-mentioned port 28. This current may for example, and preferably is, caused to pass gently in co-current flow along the side of the flame between the flame and one or more of such walls. The term gently, as used herein, signifies that the direction and/or rate of flow of the cooling gas is co-current with the flame and allows lateral expansion of the combustion gases. This co-current flow occurs at least along an appreciable portion of the length of the zone in which flame is present in the hot combustion gases, and possibly also for an appreciable distance downstream of that zone.

It is recommended that the cooling gas direction be established or controlled in a way such that the hot combustion gases can continue to expand laterally and the cooling gas can flow co-currently downstream for an appreciable distance with such gases, during which the combustion gases may continue to expand laterally. In aid of this goal it is recommended that the cooling gas linear flow rate be controlled or sufficiently limited to substantially inhibit or substantially prevent the cooling gas flow from generating turbulent flow at the central axis, or in the core, of the adjacent hot combustion gases.

It should be understood however that the mere presence of cooling gas adjacent the hot combustion gases, especially when it is substantially cooler and/or substantially slower-moving than the combustion gases, will encourage formation of some eddy currents in the outer or peripheral portion of the combustion gases. Thus, the goal of the foregoing limits or control that are impressed upon the cooling gas is the substantial inhibition or substantial prevention of any tendency for the cooling gas to bring about an immediate overall disruption of the flame, and preferably also of the flow of combustion gases that continues downstream from the zone in which flame is present. In the present embodiment, in which the air inlet port 28 that surrounds burner nozzle 22 in combustion chamber upper wall 26 is substantially annular, cooling air is admitted to the chamber in the form of a moving curtain, induced by the draft produced by the burner and downstream collection equipment, that substantially entirely surrounds the flame while performing the particle dispersion, agglomeration inhibition and other cooling gas functions described above. Optionally, additional air or other suitable dilution gas can be admitted to the combustion chamber downstream of the burner.

Any suitable means and measures may be used to collect the at least partially fused particulate product. Persons skilled in the art are well aware of suitable systems. In the present embodiment combustion chamber 27 has an integral hopper section 36 with a conical or upright funnel-like bottom section 37 into which product falls by gravity and/or is drawn by the draft provided by downstream collection equipment. An outlet 38 at the bottom of hopper 36 is connected through conduit 39 with collection equipment, such as a gas-solids separator 40, which may be of the cyclone type having top and bottom outlets 41 and 42 for gases and particulate products respectively. Outlet 41 may be connected to a bag filter (not shown), if desired, and to a blower (not shown) to provide a draft through the collection equipment.

In the fusion of feed particles by the above described method or by other preferred methods, sufficient heat is transmitted to the particles, while dispersed, to cause enough softening or melting in the respective particles so that surface tension is able to convert an appreciable portion of them from their original irregular form to a substantially more regular shape, while providing them with smooth surfaces. Then the particles are kept out of contact with one another and with other surfaces until they have been cooled to a non-tacky state. If it were possible for each individual particle to undergo fusion and experience the effects of surface tension with no interference by air currents, by other particles or by fusion apparatus components, with no particle composition inhomogeneities, with sufficient time at a suitable viscosity, and with uniformly rapid cooling, the resultant product particles would be perfectly spherical.

However, in practice, a certain amount of interference, inhomogeneities and variations in residence time and viscosity will occur. Thus, to some extent, there will be product particles that are less than perfectly spherical. Some of these less than perfectly spherical particles may be quite irregular in shape, and in some instances a substantial percentage of irregular particles will be retained intentionally in the resultant products. Yet, the objects of the invention are attained when a substantial portion of the irregular feed particles are converted to a form that appears at least generally ellipsoidal when viewed under magnification as described below and when the resultant product, as originally produced, or as packaged, or as combined with other materials for any suitable end use, contains about 15 to 100%, or about 50 to 100%, or about 75 to 100% or about 90 to 100% by volume of generally ellipsoidal particles. According to a particularly preferred embodiment of the invention, the products contain substantially spherical particles in amounts within at least one of these volume percentage ranges. More particularly, for those end uses in which discreteness of the product particles is deemed important, it is preferred that, in the compositions of matter according to the invention, the above identified portion of the resultant product that represents about 15 to 100% by volume of generally ellipsoidal particles should itself contain about 50 to 100%, more preferably about 70 to 100% and still more preferably about 90 to 100% by volume of substantially discrete particles.

"Generally ellipsoidal" particles are those whose magnified two-dimensional images appear generally rounded and free of sharp corners or edges, whether or not they appear to have truly or substantially circular, elliptical, globular or any other rounded shape. Thus, in addition to the truly circular and elliptical shapes, other shapes with curved but not circular or elliptical outlines are included.

"Substantially spherical" particles are those whose magnified two-dimensional images appear at least substantially circular. A particle will be considered substantially spherical if its outline fits within the intervening space between two concentric, truly circular outlines differing in diameter from one another by up to about 10% of the diameter of the larger of these outlines.

In general, a given particle will be considered "substantially discrete" if the outline of its image does not touch or overlap that of any other particles visible in a magnified view of the given particle and of such other particles. However, a given particle will still be considered substantially discrete if its image touches or overlaps the outline of one or any number of other particles, if the largest visible dimensions of all such other particles are respectively in the range of up to about 10% of the largest visible dimension of the given particle.

Figure 3:
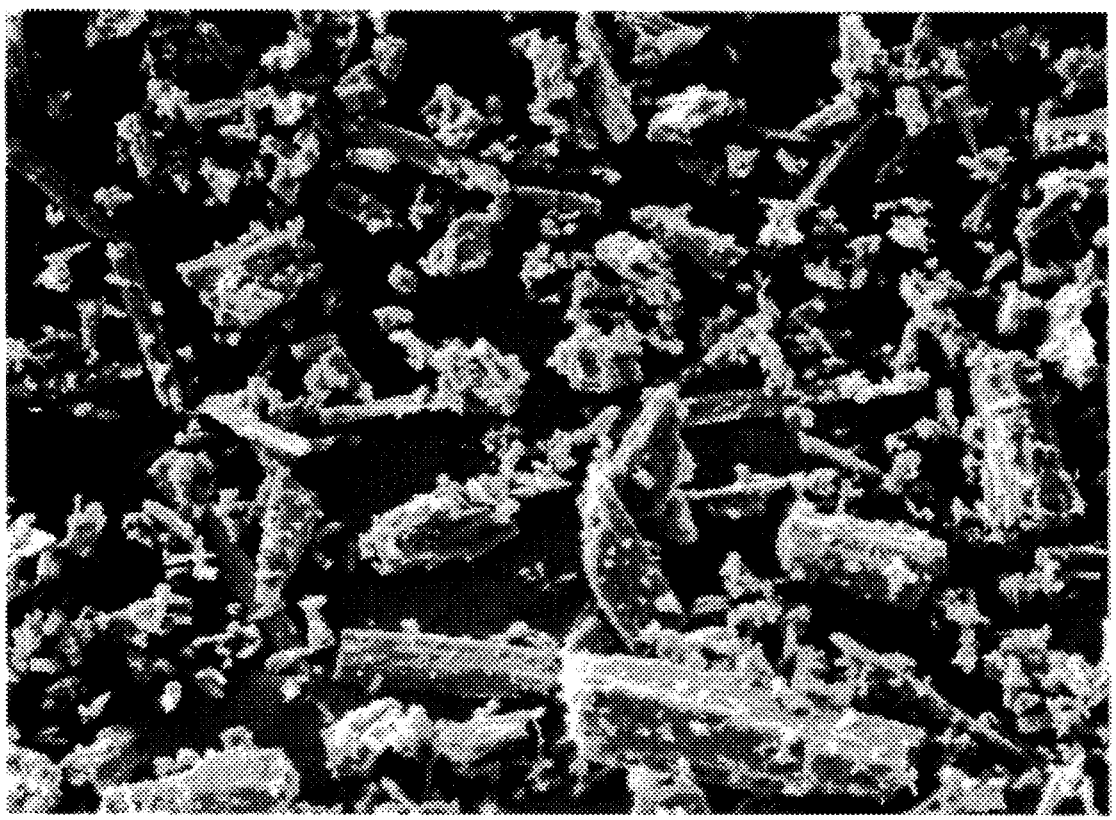
FIG. 3 is a photomicrograph of scattered particles of rough, irregular crystalline feed material for making the products of the present invention, the image having been produced with a scanning electron microscope at a magnification of ×1000.
Figure 4:
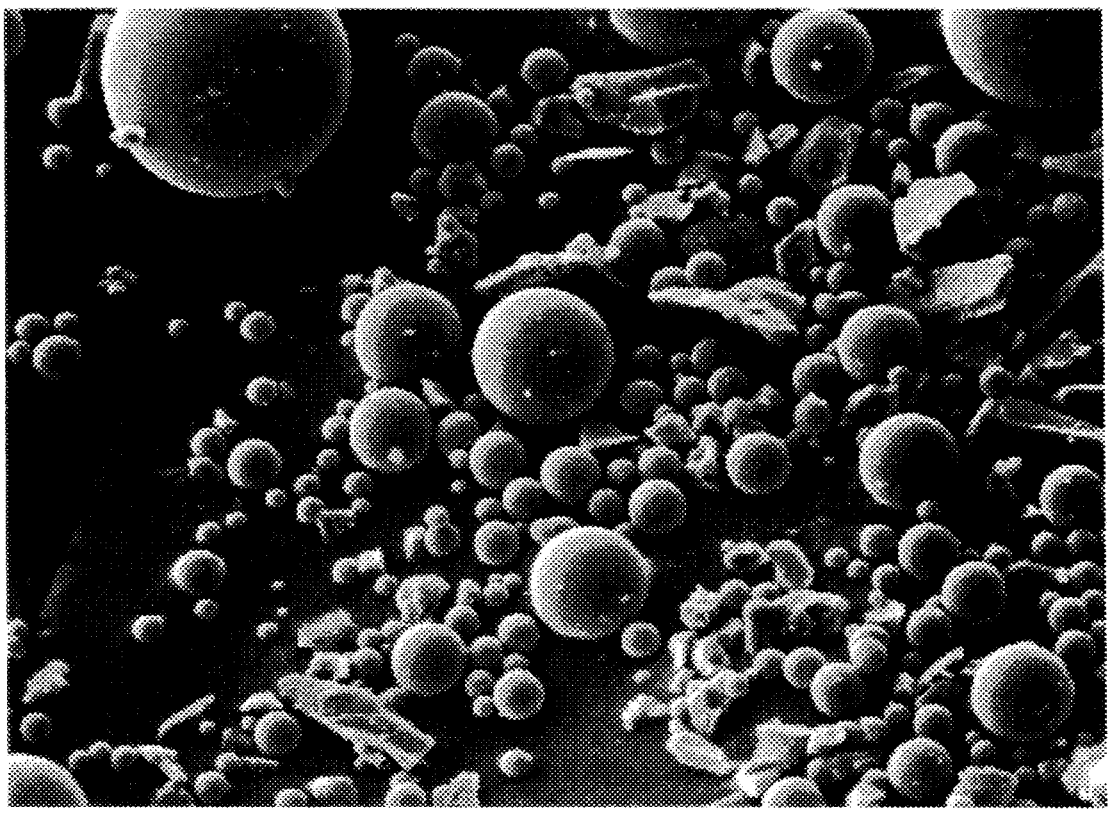
FIG. 4 is a photomicrograph, taken under the same conditions as that of FIG. 3, showing a product according to the invention resulting from at least partial fusion of the feed material of FIG. 3, which product contains both generally ellipsoidal fused particles and rough, irregular particles.

Shape, discreteness and particle size of feed material and product particles may in general be judged by viewing their two-dimensional photographic images at a magnification of ×1000, as in FIGS. 3 and 4 herein. Such images may be provided by an optical or scanning electron microscope or by a suitable alternative magnifying device at the same or equivalent magnification. Only particles entirely visible within the image under review are considered in applying the above definitions and in determining quantities of particles present. Samples used for such analyses should, unlike FIGS. 3 and 4, be prepared in a manner that sufficiently scatters the particles in the magnified views in order to minimize particle-to-particle overlap of discrete particles. The number of particles counted for determining the volume percentage of particles of a particular type in a sample should be sufficient to provide an acceptable level of confidence, such as about 95%.

The definitions of generally ellipsoidal, substantially spherical and substantially discrete given above are applied on the basis of the above-described images as viewed at the indicated magnification, even if the particles in question would not conform to these definitions if viewed at higher levels of magnification. Thus, for example, particles whose outlines appear rounded and whose surfaces appear mostly or substantially entirely smooth at this level of magnification should be considered generally ellipsoidal even if they may appear less rounded and/or less smooth at higher levels of magnification.

Determinations of particle size, discreteness and volume percent for particles of different sizes and shapes, whether generally ellipsoidal, substantially spherical or irregular, may be based on procedures described in *Handbook of Mineral Dressing*, by A. F. Taggart, John Wiley & Sons, Inc., New York, 1945, chapter 19, pages 118–120. Many refinements of this basic method are known to those skilled in the art. For instance, one may analyze the magnified two-dimensional images of suitably prepared samples using a Leica Q570 image analysis system in conjunction with a Leitz Ortholux microscope or a source that inputs data from scanned SEM (scanning electron microscope) micrographs.

Such automated image analysis systems can make direct measurements of particle area, perimeter and aspect ratio to determine equivalent circular diameter values for the two-dimensional images of all observed particles, regardless of shape. These substantially correspond to the actual values for all observed particles. Such systems readily determine equivalent circular diameter values for particles in selected particle size categories.

When supplied by the operator with a suitably defined "discriminating factor," such systems can distinguish particles that are substantially ellipsoidal or substantially spherical from those that are not and can determine area values that substantially correspond with the aggregate areas of the particles within and without these categories. A discriminating factor that has been used with apparently acceptable results for distinguishing generally ellipsoidal particles from those that are not, and which may or may not be subject to further refinement, is as follows:

$CSF \div AR > 0.55$, wherein

CSF=circular shape factor ($4\pi \times$ area of particle÷particle perimeter$^2$) as derived by the system and AR=aspect ratio (largest particle dimension or diameter÷smallest particle dimension or diameter) as derived by the system.

The respective aggregate image areas for particles whose images are and are not within the generally ellipsoidal or substantially spherical category may then be converted to volume percentages by formulas familiar to persons skilled in the art.

Automated image analysis systems of the above type are available with displays on which an operator may view particles under analysis. Such displays permit the operator to visually discriminate between particles that are and are not in a selected category, for example generally ellipsoidal, substantially spherical or substantially discrete, as above defined. Particles so identified may be selected for inclusion in groups of particles whose aggregate areas may then be determined automatically, followed by conversion of these areas to volume percentages as above described.

By the process of at least partial fusion applied to the feed particles, at least a portion of their crystalline character is destroyed. The mechanism by which this occurs has not been proven, but it is theorized that at least portions of the respective particles are raised to temperatures above the dissolution temperature of the crystalline material contained therein, and that at least a portion and usually the major portion of the crystalline structure in the respective particles is destroyed.

It should be understood that the resultant particles, although having reduced crystallinity, may not in every instance be properly described as fully amorphous. For this reason, the particulate product is referred to herein as "substantially glassy." This terminology is intended to include the possibility that generally ellipsoidal particles of the designated minerals that have been at least partly fused according to the invention may contain some but not all of their original crystallinity, while having been converted to a form with a generally ellipsoidal surface that resembles glass in terms of its smoothness, at least the surface portions of the product particles being amorphous in nature.

There is however no reason in principle why the crystal content of the generally ellipsoidal particles produced from the designated minerals should not be reduced to a major extent. Thus, in these particles, it is contemplated and possibly also even preferred, that most if not all of the crystalline structure originally present in these particles should be destroyed during the fusion operation.

It is of course also contemplated that products according to the invention, containing generally ellipsoidal substantially glassy particles respectively having chemical compositions corresponding substantially with that of any one or any combination of wollastonite, alkali feldspar, plagioclase feldspar and/or nepheline, will also contain particles of the same or other compositions that are or are not of a substantially glassy nature. Such particles that are not of a substantially glassy nature, having passed through a fusion zone, may or may not have undergone fusion, and in the latter case may retain most if not all of any original crystallinity and/or surface roughness which they may have originally possessed. Those fusion products that contain both significant amounts of crystallinity and of substantially glassy particles may be referred to as "crysto-morphic." Such a product is illustrated in FIG. 4.

The crystallinity of products produced according to the invention has been tested "in gross," meaning that X-ray diffraction has been used to measure the crystallinity of samples containing both fused and essentially un-fused particles without measuring the quantum of crystallinity present in the two different kinds of products. Crystallinity that is so measured may be expressed in terms of a weight percentage, based on the total weight of the sample. This is the mode of measurement used in the examples. Based on this mode of measuring, products containing up to about 90%, more preferably about 0.1 to about 75% and still more preferably about 5 to about 60% of crystallinity are contemplated. In some circumstances, nearly complete conversion to generally ellipsoidal products has been observed in combination with surprisingly high residual levels, e.g. 20%, of crystallinity.

In general, the specific gravity of the generally ellipsoidal products of the invention is preferably in the range of about 1.8 to about 3.1 g/cc, or more preferably in the range of about 1.8 to about 2.8 g/cc. These densities are indicative of a substantial reduction in density of about 3 to 20%, based on the density of the feed material, which may partly be the result of some trapped voids or may be the result of a phenomena related to the loss of crystallinity and conversion to a lower density "glassy" phase. Microscopic examination finds some hollow particles, but these are insufficient to account for the observed density reduction. The increased volume and lower densities are generally preferred characteristics of the products.

It is preferred that, in the compositions of matter according to the invention, the carbon content of the solid particles should be restricted. Other than carbon present in the form of organic material applied to the surfaces of the solid particles, it is preferred that the carbon content be limited to up to about 0.2%, more preferably up to about 0.15% or still more preferably up to about 0.1% by weight, based on the total weight of the solid particles.

Preferred products according to the invention have little or essentially no hematite, emery, magnetite, or other highly colored iron-containing minerals. They may for example contain up to about 0.2, more preferably up to about 0.1 and still more preferably up to about 0.05% by weight of $Fe_2O_3$ and/or $Fe_3O_4$. Similar limits apply to Manganese, e.g. MnO, and to those other metals whose oxides or other compounds tend to color the products. In the case of ferrous iron oxide, FeO, which is not so strongly colored, the preferred products may contain up to about 5%, more preferably up to about 2% and still more preferably up to about 1% by weight.

When practicing the invention with exercise of control over the kinds and amounts of carbon in the fuels and the kinds and amounts of carbon and other colorants in the feed materials, one can produce solid particle products having brightness levels that make the products particularly suitable for various end uses, certain of which are described below. For example, products with brightness levels of at least about 60 and preferably at least about 80 are contemplated.

EXAMPLES

The following examples were conducted in apparatus as depicted in FIGS. 1 and 2, using ground mineral feed materials, one of which is depicted in FIG. 3. As that figure shows, the feed is composed of rough, irregular crystalline particles. This particular feed is NYAD® 325 wollastonite as obtained from the deposit located in Lewis, Essex County, N.Y., U.S.A. and produced by NYCO® Minerals, Inc. The image in this figure was produced with a JEOL Model 840 SEM at an accelerating voltage of 10 KV at a viewing angle of 60° and a magnification of ×1000. For all examples particle size distribution was measured on a Coulter Electronics Model LS130 laser diffraction particle size analyzer and reported in volume percent at less than a given equivalent spherical diameter in microns. B.E.T. surface areas were measured using a Micromeretics Instrument Corporation Gemini 2360 Surface Area Analyzer. Densities, or specific gravities, were measured using a Micromeretics Instrument Corporation Accupyc Model 1330 pycnometer with helium as the comparison fluid. The percent by volume of generally ellipsoidal particles was visually estimated by dispersing the samples, without particle-to-particle overlap, in a 1.6 refractive index fluid under a cover glass and using a Bausch & Lomb Dynazoom Model 31-05-22 laboratory microscope at ×100 magnification. The "457 nanometer brightness" of powders (with the powder dry-packed into the sample cell) was measured using a HunterLab Color Quest DP-9000 Spectrocolorimeter System Model CQS-9400 45/0; or, alternatively, brightness values were those reported by the suppliers of the various minerals. Crystallinity was measured using a Philips vertical diffractometer with copper K$\alpha$ radiation, an adjustable incident slit diffracted beam monochrometer and proportional registry of scattered radiation. Air and gas volumes are reported at one atmosphere of pressure and at 15° C. All compositions are reported in weight percent. Compositions, melting points, refractive indices and other data pertaining to the samples of mineral feed were obtained from the literature or from data reported by the suppliers.

EXAMPLE 1

Into the apparatus of FIGS. 1 and 2, air was metered to the oxygen-containing gas pipe 3 at about 270 ft.$^3$/hr (cubic feet per hour at 20° C.). Natural gas, with a heating value of 1,000 B.T.U./ft.$^3$ was separately metered and aspirated into pipe 3 from fuel delivery pipe 4 at junction 5 at about 35 ft.$^3$/hr. An additional 80 ft.$^3$/hr. of air was injected from supply pipe 16 and nozzle 17 through venturi 18 into the feed entry leg 8 of Y 6. The sample prepared for this example was NYAD® 325 wollastonite having: a composition of 51% $SiO_2$; 0.3% $Al_2O_3$; 46.9% CaO; 0.61% $Fe_2O_3$; a melting point reported as 1540° C.; a crystallinity by X-ray diffraction of 100%; a B.E.T. surface area of 5.07 m$^2$/cc; a refractive index of 1.63; a particle size distribution with 90%, 50% and 10% less than 49, 13 and 3 microns respectively; a specific gravity of 2.91 g/cc; and a G.E. Brightness of 90. One hundred grams of sample was passed through a 100 mesh sieve, placed in funnel 13, transferred over conveyor 14 and aspirated through inlet 15 into venturi 18, at a rate of 0.5 lb. per hr., and dispersed into the air and gas mixture supplied via the Y exit leg 9 to the ignited burner 20. After entrainment and dilution of the dispersed particles with additional air drawn into the combustion chamber 27 through port 28, the resultant particle-containing combustion gases were then exhausted from the hopper 36 at about 10,000 ft.$^3$/hr. at about 90° C. The free flowing white powder product, slippery to the touch, was collected at 95% yield using cyclone 40.

As shown in the photomicrograph of FIG. 4, prepared under the same conditions as that of FIG. 3, the product has many generally ellipsoidal, smooth-surfaced particles, the exterior surfaces of which are believed to be formed predominantly of fused, generally amorphous material having essentially the chemical composition (allowing for vaporization of volatile feed components), but not the crystalline structure of, the designated mineral from which they are produced. Some rough, irregular particles are also present. Based on microscopic observation, 80% by volume of the particles in the sample are generally ellipsoidal. By X-ray diffraction of another sample of this same material, it was found to contain about 13% by weight, based on the total sample weight, of residual crystalline material. The B.E.T. surface area was measured as 0.88 m$^2$/cc. In this sample, 90%, 50% and 10% of the particles have particle diameters less than 38, 13 and 4 microns, respectively. The specific gravity is 2.83 g/cc.

EXAMPLE 2

One hundred grams of NYAD® 325, identical to that in Example 1, was passed through a 100 mesh screen and aspirated at 3.5 lbs. per hr. into the apparatus of FIGS. 1 and 2. All other conditions were the same as in example 1, and the product sample was collected in 91% yield.

By microscopic observation 75% of the particles in the product were generally ellipsoidal. The product has: a B.E.T. surface area of 1.04 m$^2$/cc; a specific gravity of 2.88 g/cc; and a size distribution wherein 90%, 50% and 10% of the particles have diameters less than 47, 16 and 4 microns respectively.

EXAMPLE 3

The feed sample prepared for this example was G-200 alkali feldspar having: a composition of 66.8% $SiO_2$; 18.4% $Al_2O_3$; 3.0% $Na_2O$; 10.7% $K_2O$; 0.8% CaO; 0.08% $Fe_2O_3$; a crystallinity by X-ray diffraction of 100%; a B.E.T. surface area of 3.0 m$^2$/cc; a particle size distribution with 90%, 50% and 10% less than 47, 16 and 3 microns respectively; and a specific gravity of 2.57 g/cc. One hundred grams of this material was fed under the same conditions as Example 1, and the product sample was collected in 89.6% yield.

By microscopic observation 90% of the particles in the product were generally ellipsoidal. The product has: a B.E.T. surface area of 0.28 m$^2$/cc.; a residual crystallinity of about 8%; a specific gravity of 2.38 g/cc; and a size distribution wherein 90%, 50% and 10% of the particles have diameters of less than 58, 21 and 5 microns respectively.

EXAMPLE 4

One hundred grams of G-200 alkali feldspar, identical to that in Example 3, was passed through a 100 mesh screen and aspirated at 3.5 lbs. per hr. into the apparatus of FIGS. 1 and 2. All other conditions were the same as in example 1, and the product sample was collected in 91.5% yield.

By microscopic observation 85% of the particles in the product were generally ellipsoidal. The product has: a B.E.T. surface area of 0.34 m$^2$cc; a specific gravity of 2.40 g/cc; and a size distribution wherein 90%, 50% and 10% of the particles have diameters less than 57, 21 and 4 microns respectively.

EXAMPLE 5

The feed sample prepared for this example was Minex 4 nepheline with kalsilite in solid solution (nepheline syenite) having: a composition of 60.0% $SiO_2$; 23.7% $Al_2O_3$; 10.6% $Na_2O$; 4.8% $K_2O$; 0.4% CaO; 0.1% $Fe_2O_3$; loss on ignition 0.67%; a crystallinity of 73% by X-ray diffraction (the nepheline phase was not detected by X-ray analysis, but is reported by Rosiwal staining methods); a B.E.T. surface area of 4.2 m$^2$/cc; a particle size distribution with 90%, 50% and 10% less than 24, 10 and 3 microns respectively; a specific gravity of 2.61 g/cc; and a Color Quest 457 nanometer brightness of 84. One hundred grams of this material was fed under the same conditions prevailing in Example 1, and the product sample was collected in 87.5% yield.

By microscopic observation 95% of the particles in the product were generally ellipsoidal. The product has: a B.E.T. surface area of 0.48 m$^2$/cc; a residual crystallinity of about 8%; a specific gravity of 2.41 g/cc; and a size distribution wherein 90%, 50% and 10% of the particles have diameters of less than 23, 11 and 3 microns respectively.

EXAMPLE 6

One hundred grams of Minex 4 nepheline syenite, identical to that in Example 5, was passed through a 100 mesh screen and aspirated at 3.5 lbs. per hr. into the apparatus of FIGS. 1 and 2. All other conditions were the same as in example 1, and the product sample was collected in 87.5% yield.

By microscopic observation 80% of the particles in the product were generally ellipsoidal. The product has: a B.E.T. surface area of 0.41 m$^2$/cc; a specific gravity of 2.43 g/cc; and a size distribution wherein 90%, 50% and 10% of the particles have diameters less than 28, 13 and 4 microns respectively.

EXAMPLE 7

The feed sample for this example was plagioclase feldspar (Aplite). It was prepared using an Alpine jet mill and classifier to reduce the particle size below the 300 micron average size of the supplied material and had: a composition of 63.8% $SiO_2$; 21.8% $Al_2O_3$; 5.8% $Na_2O$; 2.6% $K_2O$; 5.4% CaO; 0.1% $Fe_2O_3$; a crystallinity by X-ray diffraction of 100%; a B.E.T. surface area of 2.33 m$^2$/cc.; a particle size distribution wherein 90%, 50% and 10% of the particles had diameters less than 41, 20 and 5 microns respectively; and a specific gravity of 2.68 g/cc. One hundred grams of this material was fed under the same conditions used in Example 1, and the product sample was collected in 97.4% yield.

By microscopic observation 98% of the particles in the product were generally ellipsoidal. The product has: a B.E.T. surface area of 0.44 m$^2$/cc.; a residual crystallinity by X-ray diffraction of about 31%; a specific gravity of 2.43 g/cc; and a size distribution wherein 90%, 50% and 10% of the particles have diameters of less than 32, 17 and 5 microns respectively.

EXAMPLE 8

One hundred grams of plagioclase feldspar (Aplite), identical to that used in Example 7, was passed through a 100 mesh screen and aspirated at 3.5 lbs. per hr. into the apparatus of FIGS. 1 and 2. All other conditions were the same as in Example 1, and the product sample was collected in 97.2% yield.

By microscopic observation 95% of the particles in the product were generally ellipsoidal. The product has: a B.E.T. surface area of 0.19 m$^2$/cc.; a specific gravity of 2.44 g/cc; and a size distribution wherein 90%, 50% and 10% of the particles have diameters less than 37, 19 and 5 microns respectively.

EXAMPLE 9

The feed sample prepared for this example was NC-4 alkali feldspar having: a composition of 68.8% $SiO_2$; 18.7% $Al_2O_3$; 6.9% $Na_2O$; 3.8% $K_2O$; 1.6% CaO; 0.05% $Fe_2O_3$; a reported melting point of 1020° C.; a loss on ignition of 0.13%; a crystallinity of 100% (crystalline quartz, microcline and albite totalling 88% were detected by X-ray analysis and the Niggli Molecular Norm calculation suggests that the remaining minerals are additional albite, orthoclase and anorthite compositions not detected by X-ray diffraction); a B.E.T. surface area of 3.10 m$^2$/cc.; a particle size distribution of 90%, 50% and 10% less than 39, 14 and 3 microns respectively; a specific gravity of 2.59 g/cc; and a Color Quest 457 nanometer brightness of 88. One hundred grams of this material was fed under the same conditions as Example 1, and the product sample was collected in 94.3% yield.

By microscopic observation 95% of the particles in the product were generally ellipsoidal. The product has: a B.E.T. surface area of 0.36 m$^2$/cc.; a residual crystallinity of about 11%; a specific gravity of 2.41 g/cc; a Color Quest 457 nanometer brightness of 81; and a size distribution wherein 90%, 50% and 10% of the particles have diameters of less than 32, 11 and 3 microns respectively.

EXAMPLE 10

One hundred grams of NC-4 alkali feldspar, identical to that in Example 9, was passed through a 100 mesh screen and aspirated at 3.5 lbs. per hr. into the apparatus of FIGS. 1 and 2. All other conditions were the same as in example 1, and the product sample was collected in 94.1% yield.

By microscopic observation 90% of the particles in the product were generally ellipsoidal. The product has: a residual crystallinity of 16%; a B.E.T. surface area of 0.29 m$^2$/cc.; a specific gravity of 2.42 g/cc; and a size distribution wherein 90%, 50% and 10% of the particles have diameters less than 42, 17 and 4 microns respectively.

EXAMPLE 11

One hundred grams of NC-4 alkali feldspar, identical to that in Example 9, was passed through a 100 mesh screen and aspirated at 0.5 lbs. per hr. into the apparatus of FIGS. 1 and 2. All other conditions were the same as in example 1, except that about 15 ft.$^3$/hr. of oxygen gas was metered to the combustion air supply line and the total (metered and venturi injected) combustion air was correspondingly reduced by about 75 ft.$^3$/hr., to about 275 ft.$^3$/hr. The product sample was collected in 97.8% yield.

By microscopic observation 98% of the particles in the product were generally ellipsoidal. The product has: a B.E.T. surface area of 0.70 m$^2$/cc.; a specific gravity of 2.42 g/cc; and a size distribution wherein 90%, 50% and 10% of the particles have diameters less than 36, 13 and 4 microns respectively.

EXAMPLE 12

The feed sample prepared for this example was Unimin 140 ground silica (obtained from Unimin Corp.) having: a composition of 99.5% $SiO_2$; 0.2% $Al_2O_3$; 0.0% $Na_2O$; 0.0% $K_2O$; 0.02% CaO; 0.05% $Fe_2O_3$; a crystallinity by X-ray diffraction of 100%; a B.E.T. surface area of 2.38 m$^2$cc.; a particle size distribution with 90%, 50% and 10% less than 75, 24 and 3 microns respectively; and a specific gravity of 2.65 g/cc. One hundred grams of this material was fed under the same conditions as Example 1, and the product sample was collected in 81.3% yield.

By microscopic observation less than 2% of the particles in the product were generally ellipsoidal. The product has: a B.E.T. surface area of 0.34 m$^2$/cc.; a residual crystallinity of about 86%; a specific gravity of 2.61 g/cc; and a size distribution wherein 90%, 50% and 10% of the particles have diameters of less than 69, 25 and 5 microns respectively.

EXAMPLE 13

One hundred grams of Unimin 140 ground silica, identical to that in Example 12, was passed through a 100 mesh screen and aspirated at 0.5 lbs. per hr. into the apparatus of FIGS. 1 and 2. All other conditions were the same as in example 1, except that about 15 ft.$^3$/hr. of oxygen gas was metered to the combustion air supply line and the total (metered and venturi injected) combustion air was correspondingly reduced by about 75 ft.$^3$/hr., to about 275 ft.$^3$/hr. The product sample was collected in 97.8% yield.

By microscopic observation less than 2% of the particles in the product were generally ellipsoidal. The product has: a B.E.T. surface area of 1.02 m$^2$/cc.; a residual crystallinity of 88%; a specific gravity of 2.62 g/cc; and a size distribution wherein 90%, 50% and 10% of the particles have diameters less than 72, 25 and 5 microns respectively.

EXAMPLE 14

The feed sample prepared for this example was Minex 10 nepheline syenite having: a composition of 60.0% $SiO_2$; 23.7% $Al_2O_3$; 10.6% $Na_2O$; 4.8% $K_2O$; 0.37% CaO; 0.08% $Fe_2O_3$; loss on ignition 0.67%; a B.E.T. surface area of 10.65 m$^2$/cc; a particle size distribution with 90%, 50% and 10% less than 9, 4 and 2 microns respectively; a specific gravity of 2.65 g/cc. Six hundred grams of this material was passed through a 100 mesh screen and aspirated at 1.25 lbs per hr. into the apparatus of FIGS. 1 and 2. All other process conditions were the same as in Example 1, except that the product sample was collected using a Premier reverse pulse (filter receiver) "bag house" in 70% yield (the remaining material clung tenaciously to the filter media).

By microscopic observation, 99% of the particles in the product recovered from the bag house were generally ellipsoidal, with about 10% being large generally ellipsoidal particles with diameters from 10 microns to 80 microns (presumed to be the result of fusion of agglomerates). The recovered product has: a B.E.T. surface area of 2.86 m$^2$/cc; a specific gravity of 2.38 g/cc; and a size distribution wherein 90%, 50% and 10% of the particles have diameters of less than 28, 4.6 and 2 microns respectively.

EXAMPLE 15

Two hundred seventy grams of NC-4 alkali feldspar powder (identical to that used in Example 9) and 30 grams of pigment grade $TiO_2$ (KRONOS™ 2073 supplied by KRONOS, INC., Houston, Tex., U.S.A.) were thoroughly mixed in a ball mill. Separately, 1.26 g. of a sodium lignin sulfonate (Norlig 12 supplied by Lignotech of Rothschild, Wis., U.S.A.) was dissolved in 24 g. of water. The powder mixture and the solution were combined, thoroughly mixed, spread in a tray, and dried for one hour at 120° C., to form a friable, loosely-caked material. This material was pulverized and passed through a 230 mesh screen to provide a feed consisting of agglomerated NC-4 and $TiO_2$ particles.

One hundred grams of agglomerated feed were aspirated into the apparatus of FIGS. 1 and 2 at about 3.5 lb. per hr. with all other process conditions the same as for Example 1. The product sample was collected from the cyclone in 96.8 percent yield.

By microscopic observation 90% of the particles in the product were generally ellipsoidal. Many of the 5 to 60 micron particles were speckled with approximately 1 micron or smaller regions of high opacity (presumed to be $TiO_2$ particles either attached or partly fused to the surface of the larger feldspar particles). A small number (less than 2 percent) of large, opaque, non-spherical particles was also observed (assumed to be fused, or partly fused, agglomerates of $TiO_2$ which were not fully dispersed in the ball mill). The product has: a B.E.T. surface area of 1.24 m$^2$/cc; a specific gravity of 2.47 g/cc; and a size distribution wherein 90%, 50% and 10% of the particles have diameters less than 56, 19 and 6 microns respectively.

INDUSTRIAL APPLICABILITY

It is expected that products according to the invention will be supplied to industry as compositions of matter that are composed substantially of the solid particles, including generally ellipsoidal particles with or without particles of other shapes. However, due to the diverse practical uses of the particulate products, it is expected that compositions of matter of the present invention, referred to in the accompanying claims, will take many different and varied forms. Some illustrations are given below.

Compositions of matter comprising the solid particles disclosed herein may take the form of mixtures of such solid particles, including the generally ellipsoidal particles, with polymeric materials of all types, for instance thermoplastic and thermosetting resins, elastomers and other forms, including for example all materials popularly known as plastics. In such mixtures, the volume of solid particles, based on the total volume of such particles and polymeric material, can vary through out the range of about 0.05% (e.g., when small amounts of particles are present in films as anti-blocking agents) to about 99.9% (e.g. when small amounts of polymer are present as a surface treatment on the particles).

Katz and Milewski, supra, at pages 311 to 315, discuss uses of glass beads in polymeric materials. The products of the invention will be useful in most if not all of these applications, especially since the invention provides an economical source of generally ellipsoidal particles in the range of up to about 50 microns in average diameter. Similarly, with only minor formulation adjustments, the generally ellipsoidal particles will be useful for most if not all of the applications described in the literature for fused silica, spherical alumina, silica, feldspar, calcium carbonate, nepheline syenite, alumina trihydrate and other particulates used as additives or neat powders. Products of this invention can replace at least partly and in many cases fully the volume of particulate additives used or contained in a given application or formulation. Only minor additional adjustments to attain the desired viscosity, texture or other properties of importance will be required.

Particles in the foregoing small size range, especially those with an average diameter of about 25 microns or less, are important for producing composites, including molded products and laminates, with smooth surfaces that have high resistance to abrasion and staining. Consequently, these particles will be especially useful in amino polymer plastics, polyesters, phenolics, epoxies and other resins used for preparing a wide variety of molding compounds and molded members for the electrical transportation industry and other industries, as well as for preparing laminating mixes, laminates and other items for counter tops, vanities and other applications for the building and construction industries. For these purposes, the solid particles of the present invention, in their various mixtures with polymeric material, are preferably present in amounts of about 5 to about 65% by volume, based on the volume of the entire composition.

Another valuable end-use is in polymeric films of any kind that contain said solid particles. For example, when incorporated in polymeric films in a sufficient amount, the particulate products impart anti-blocking properties to said films. To illustrate, homogeneously blending about 0.05 to about 0.5% by volume of these products into polyethylene and/or other films enables those films to be stored in layered (including wound) form under typical warehouse conditions, e.g. at film temperatures up to about 45° C., without "blocking" or fusing of the film layers to one another. In preferred products for these anti-blocking applications, 90 to 100% by volume of the particles have diameters of up to about 15 microns and about 80 to 100% by volume of the particles are generally ellipsoidal.

Extenders for paint represent another valuable application. Economical availability of products with low color in small sizes that are abundant in rounded particles makes it possible to add these products to liquid coating compositions as fillers at loadings in the range of about 5 to about 50% of the total volumes of said compositions. With particulate products having very small particle sizes and an abundance of substantially spherical particles, only relatively modest viscosity increases, e.g. less than half the viscosity increase that would be expected when using fillers in the form of typical irregularly shaped particles, are experienced. Preferred examples of particulate products useful for such applications are those having Color Quest 457 nanometer brightness of at least about 80, with about 90 to 100% by volume of the particles having diameters in the range of up to about 25 microns and with about 75 to 100% by volume of the particles being generally ellipsoidal or substantially spherical.

Also, the compositions of the present invention include liquid coating compositions that are curable to solid decorative or protective coatings, including architectural paints, industrial coatings, wood stains and other coatings. In these compositions, the particulate materials may be used if desired to displace other ingredients that are expensive or environmentally troublesome, such as solvents. Also, products composed to a large extent of rounded particles, for example those that contain about 70 to about 100% by volume of generally ellipsoidal particles, can be incorporated in coatings to provide improved durability.

The products of the invention can also be used in coatings in sufficient amounts to impart controlled surface texture to them and thereby to provide gloss reduction and "flatting" effects in combination with improved stain and scrub resistance. Products in which about 90 to 100% by volume of the particles have diameters of up to about 25 microns and which contain about 60 to 100% of generally ellipsoidal particles are preferred for these applications.

The solid particles of the present invention, which can readily be made with melting points higher than those of glass beads, are potentially useful in shaped metallic members of the kind that include a matrix of metallic material in which said solid particles are dispersed, for example as an additive to improve durability or hardness. Such metallic materials may for example be selected from among zinc, aluminum and alloys containing at least one of said metallic materials. In such compositions, the products of the invention offer potential savings in both weight and cost.

Inert, non-abrasive generally ellipsoidal fillers are useful in soap and cosmetic formulations, because of the smooth texture they impart to such formulations. Thus, it is possible to provide compositions in the form of smooth-textured fluent or spreadable material comprising the solid particles of the present invention dispersed in a pharmacologically acceptable vehicle for application to the skin or other body parts of humans or animals. Freedom of the particulate products from heavy metals and other noxious materials will be required in many if not all of these applications. In the products preferred for these applications, about 90 to 100% by volume of the solid particles will have diameters in the range of up to 10 microns and about 90 to 100% by volume of the particles will be generally ellipsoidal or substantially spherical.

The paper industry has large requirements for specialty fillers of all types, and the invention offers the opportunity of formulating papers with a high degree of surface smoothness and durability. Thus, the invention makes possible compositions of matter in the form of smooth-surfaced webs comprising woven or non-woven fibers as the principal structural elements of the webs, with the solid particles of the invention being present in said webs as an additive, whether or not such webs include polymeric material. For these applications, products with average particle sizes in the range of up to about 10 microns are preferred.

Solid particles in accordance with the invention are useful for preparing many caulks, organic and inorganic cements, and other compositions. Among these are compositions of matter in the form of smooth-textured fluent or spreadable adhesives comprising said solid particles dispersed therein. It is anticipated that products of this invention that are abundant in rounded particles, preferably those containing about 50 to 100% by volume of generally ellipsoidal or substantially spherical particles and having an average particle size in the range of up to about 10 microns, will be useful as additives for modifying the properties of adhesives, providing combinations of tack, elasticity, elongation and possibly other properties that were not previously available. Other useful compositions include powders comprising at least an inorganic cement-forming component in admixture with said solid particles. White grades of the products of the invention are useful in these compositions where appearance is an important feature. For example transparent products having a Color Quest 457 nanometer brightness of at least about 80 and average particle diameters in the range of up to about 10 microns are preferred for use in dental compositions.

Katz and Milewski, supra, in chapter 4, describe using mixtures of particles with large and small diameters to provide combinations with high "packing" factors or high bulk density. Such combinations are important for the formulation of composites in which generally ellipsoidal particles represent a very high volume percentage of the solid particles therein, and consequently contain a minimum of other ingredients. Composites giving high performance at elevated temperatures, such as may be used in aerospace and other applications, are made possible by such formulating techniques. The invention makes readily available products that are abundant in particles within the small size ranges needed for these mixtures.

The generally ellipsoidal particles of this invention, either by themselves or in combination with other materials, including for instance other kinds of solid or cellular particulates, can be used to form non-flowable porous structures. The particles of such structures may be rendered temporarily or permanently adherent to one another by high-temperature sintering or by bonding the particles together in bulk, such as with small additions of adhesives or cements. These products are useful in block, slab, or other shaped forms to act as lightweight structural materials. By suitable selection of particle size and level of bonding agents, the porosity of these materials can be controlled to provide utility as filters, such as for gases and/or liquids.

Generally ellipsoidal particles derived from wollastonite can have a refractive index as high as 1.6 or greater. This refractive index is high enough to render these particles useful for making coatings and films with high light reflectance for lane and other highway markings. Large particles with particle sizes of 75 microns and larger are preferred for these uses.

Particles in accordance with the invention are useful in curable liquid and solid polymeric compositions generally. They are however particularly useful in UV-curable compositions due to their relatively high UV transparency, as compared with other fillers.

Neat or powdered forms of the products of this invention, because of the rounded particle shapes, have an unusual degree of lubricity or slipperiness to the touch. This property causes those embodiments of the invention which are abundant in free flowing generally ellipsoidal particles to be useful in a wide range of applications, such as lubricants for a variety of friction control applications, powders for skin protection, slip agents between film and paper layers and agents for controlling the tackiness or stickiness of surfaces in general.

Any form of surface treatment with silane coupling agents, organic titanates, surfactants, dispersants, wetting agents, etchants (acidic or basic), or other agents, and any other method of surface modification, may be used to enhance the performance of the generally ellipsoidal particles in any application. See *Silane Coupling Agents*, Plueddemann, E. P., 2d Ed., Plenum Press, 1991. For additional information regarding organic titanate and silane coupling agents, to improve bonding with polymeric materials, see also U.S. Pat. Nos. 3,834,924 to Grillo, 3,290,165 and 3,567,680 to Iannicelli, and 4,268,320 and 4,294,750 to Klingaman and Ehrenreich.

The end-uses of the products of the present invention that are described above are those which presently appear most attractive. The foregoing disclosures of embodiments of the invention and end-uses therefor have been given merely for purposes of illustration and not to limit the invention. Thus, the invention should be considered to include all embodiments falling within the scope of the following claims and equivalents thereof.

I claim:

1. A composition of matter comprising solid particles,
   A. at least a portion of said particles being substantially glassy, generally ellipsoidal particles that have been respectively formed from feed particles composed substantially of at least one material selected from the group consisting of wollastonite, alkali feldspar, plagioclase feldspar and nepheline, without conversion of said feed particles into bulk liquid form; and
   B. said composition comprising about 15 to 100% by volume of said substantially glassy, generally ellipsoidal particles that are products of at least partial fusion of said feed particles, said volume being based on the total volume of solid particles present in said composition of matter.

2. A composition of matter according to claim 1 wherein said material includes wollastonite.

3. A composition of matter according to claim 1 wherein said material includes alkali feldspar.

4. A composition of matter according to claim 1 wherein said material includes plagioclase feldspar.

5. A composition of matter according to claim 1 wherein said material includes nepheline.

6. A composition of matter according to claim 1 wherein said material includes a combination of at least two materials selected from the group consisting of wollastonite, alkali feldspar, plagioclase feldspar and nepheline.

7. A composition of matter comprising solid particles
   A. at least a portion of said particles being substantially glassy, generally ellipsoidal particles that have been respectively formed from feed particles without conversion of said feed particles into bulk liquid form; and
   B. said composition comprising about 15 to 100% by volume of said substantially glassy, generally ellipsoidal particles that are products of at least partial fusion of said feed particles and that respectively have chemical compositions corresponding substantially with material selected from the group consisting of wollastonite, alkali feldspar, plagioclase feldspar and nepheline, said volume being based on the total volume of solid particles present in said composition of matter.

8. A composition of matter according to claim 7 wherein the chemical composition of the substantially glassy product corresponds substantially with that of wollastonite.

9. A composition of matter according to claim 7 wherein the chemical composition of the substantially glassy product corresponds substantially with that of alkali feldspar.

10. A composition of matter according to claim 7 wherein the chemical composition of the substantially glassy product corresponds substantially with that of plagioclase feldspar.

11. A composition of matter according to claim 7 wherein the chemical composition of the substantially glassy product corresponds substantially with that of nepheline.

12. A composition of matter comprising solid particles
    A. at least a portion of said solid particles being generally ellipsoidal particles that are substantially glassy;
    B. at least a portion of said solid particles respectively having chemical compositions corresponding substantially with that of material selected from the group consisting of wollastonite, alkali feldspar, plagioclase feldspar and nepheline; and
    C. said composition of matter comprising about 15 to 100% by volume of said generally ellipsoidal particles that have said chemical compositions, based on the total volume of solid particles present in said composition of matter.

13. A composition of matter according to claim 12 wherein said about 15 to 100% by volume of particles have chemical compositions which correspond substantially with that of wollastonite.

14. A composition of matter according to claim 12 wherein said about 15 to 100% by volume of particles have chemical compositions which correspond substantially with that of alkali feldspar.

15. A composition of matter according to claim 12 wherein said about 15 to 100% by volume of particles have chemical compositions which correspond substantially with that of plagioclase feldspar.

16. A composition of matter according to claim 12 wherein said about 15 to 100% by volume of particles have chemical compositions which correspond substantially with that of nepheline.

17. A composition of matter according to claim 12 which also includes up to about 85% by volume of solid particles that are not generally ellipsoidal and that have a chemical composition corresponding substantially with that of wollastonite, alkali feldspar, plagioclase feldspar or nepheline.

18. A composition of matter according to claim 12 in which the 457 nanometer brightness of said solid particles is at least about 60.

19. A composition of matter according to claim 12 in which the carbon content of said solid particles, other than carbon present in the form of organic material applied to the surfaces of the solid particles, is up to about 0.2% by weight, based on the total weight of the solid particles.

20. A composition of matter according to claim 12 in which the solid particles contain up to about 0.2% by weight of $Fe_2O_3$ and/or $Fe_3O_4$, based on the total weight of the solid particles.

21. A composition of matter according to claim 12 in which the solid particles of said composition have particle sizes of up to about 500 microns and about 50 to 100% by volume of said particles have particle sizes in the range of about 1 to about 250 microns.

22. A composition of matter according to claim 21 in which the solid particles of said composition have an average particle size in excess of 1 micron.

23. A composition of matter according to claim 21 in which the particles of said composition have an average particle size in excess of 2 microns.

24. A composition of matter according to claim 21 in which the particles of said composition have an average particle size in the range of about 3 to about 100 microns.

25. A composition of matter according to claim 21 in which the particles of said composition have an average particle size in the range of about 3 to about 50 microns.

26. A composition of matter according to claim 21 in which the particles of said composition have an average particle size in the range of about 3 to about 25 microns.

27. A composition of matter according to claim 21 in which about 50 to 100% by volume of said about 15 to 100% of the particles are substantially discrete particles.

28. A composition of matter according to claim 21 in which about 70 to 100% by volume of said about 15 to 100% of the particles are substantially discrete particles.

29. A composition of matter according to claim 21 in which about 90 to 100% by volume of said about 15 to 100% of the particles are substantially discrete particles.

30. A composition of matter according to claim 12 that is composed substantially of said solid particles.

31. A composition of matter according to claim 12 in which the carbon content of said solid particles, other than carbon present in the form of organic material applied to the surfaces of the solid particles, is up to about 0.15% by weight, based on the total weight of the solid particles.

32. A composition of matter according to claim 12 in which the carbon content of said solid particles, other than carbon present in the form of organic material applied to the surfaces of the solid particles, is up to about 0.1% by weight, based on the total weight of the solid particles.

33. A composition of matter according to claim 12 in which the solid particles contain up to about 0.1% by weight of $Fe_2O_3$ and/or $Fe_3O_4$, based on the total weight of the solid particles.

34. A composition of matter according to claim 12 in which the solid particles contain up to about 0.05% by weight of $Fe_2O_3$ and/or $Fe_3O_4$, based on the total weight of the solid particles.

35. A composition of matter comprising solid particles
   a. having a 457 nanometer brightness of at least about 60;
   b. having particle sizes of up to about 500 microns, with about 50 to 100% by volume of said particles having particle sizes in the range of about 1 to about 250 microns;
   c. at least a portion of said particles being substantially glassy, generally ellipsoidal particles that have been respectively formed from feed particles composed substantially of at least one material selected from the group consisting of wollastonite, alkali feldspar, plagioclase feldspar and nepheline, said material including at least wollastonite, without conversion of said feed particles into bulk liquid form;
   d. said composition comprising about 15 to 100% by volume of said substantially glassy, generally ellipsoidal particles that are products of at least partial fusion of said feed particles, said volume being based on the total volume of solid particles present in said composition of matter;
   e. about 50 to 100% by volume of said about 15 to 100% of the particles being substantially discrete particles; and
   f. said composition of matter also including up to about 85% by volume of solid particles that are not generally ellipsoidal and that have a chemical composition corresponding substantially with that of wollastonite, alkali feldspar, plagioclase feldspar or nepheline.

36. A composition of matter comprising solid particles
   a. having a 457 nanometer brightness of at least about 60;
   b. having particle sizes of up to about 500 microns, with about 50 to 100% by volume of said particles having particle sizes in the range of about 1 to about 250 microns;
   c. at least a portion of said particles being substantially glassy, generally ellipsoidal particles that have been respectively formed from feed particles composed substantially of at least one material selected from the group consisting of wollastonite, alkali feldspar, plagioclase feldspar and nepheline, said material including at least alkali feldspar, without conversion of said feed particles into bulk liquid form;
   d. said composition comprising about 15 to 100% by volume of said substantially glassy, generally ellipsoidal particles that are products of at least partial fusion of said feed particles, said volume being based on the total volume of solid particles present in said composition of matter;
   e. about 50 to 100% by volume of said about 15 to 100% of the particles being substantially discrete particles; and
   f. said composition of matter also including up to about 85% by volume of solid particles that are not generally ellipsoidal and that have a chemical composition corresponding substantially with that of wollastonite, alkali feldspar, plagioclase feldspar or nepheline.

37. A composition of matter comprising solid particles
   a. having a 457 nanometer brightness of at least about 60;
   b. having particle sizes of up to about 500 microns, with about 50 to 100% by volume of said particles having particle sizes in the range of about 1 to about 250 microns;
   c. at least a portion of said particles being substantially glassy, generally ellipsoidal particles that have been respectively formed from feed particles composed substantially of at least one material selected from the group consisting of wollastonite, alkali feldspar, plagioclase feldspar and nepheline, said material including at least plagioclase feldspar, without conversion of said feed particles into bulk liquid form;
   d. said composition comprising about 15 to 100% by volume of said substantially glassy, generally ellipsoidal particles that are products of at least partial fusion of said feed particles, said volume being based on the total volume of solid particles present in said composition of matter;

e. about 50 to 100% by volume of said about 15 to 100% of the particles being substantially discrete particles; and f. said composition of matter also including up to about 85% by volume of solid particles that are not generally ellipsoidal and that have a chemical composition corresponding substantially with that of wollastonite, alkali feldspar, plagioclase feldspar or nepheline.

38. A composition of matter comprising solid particles a. having a 457 nanometer brightness of at least about 60;

b. having particle sizes of up to about 500 microns, with about 50 to 100% by volume of said particles having particle sizes in the range of about 1 to about 250 microns;

c. at least a portion of said particles being substantially glassy, generally ellipsoidal particles that have been respectively formed from feed particles composed substantially of at least one material selected from the group consisting of wollastonite, alkali feldspar, plagioclase feldspar and nepheline, said material including at least nepheline, without conversion of said feed particles into bulk liquid form;

d. said composition comprising about 15 to 100% by volume of said substantially glassy, generally ellipsoidal particles that are products of at least partial fusion of said feed particles, said volume being based on the total volume of solid particles present in said composition of matter;

e. about 50 to 100% by volume of said about 15 to 100% of the particles being substantially discrete particles; and f. said composition of matter also including up to about 85% by volume of solid particles that are not generally ellipsoidal and that have a chemical composition corresponding substantially with that of wollastonite, alkali feldspar, plagioclase feldspar or nepheline.

39. A composition of matter comprising solid particles a. having a 457 nanometer brightness of at least about 60;

b. having particle sizes of up to about 500 microns, with about 50 to 100% by volume of said particles having particle sizes in the range of about 1 to about 250 microns;

c. at least a portion of said solid particles being generally ellipsoidal particles that are substantially glassy;

d. at least a portion of said solid particles respectively having chemical compositions corresponding substantially with that of wollastonite;

e. said composition of matter comprising about 15 to 100% by volume of said generally ellipsoidal particles that have said chemical compositions, based on the total volume of solid particles present in said composition of matter; and f. about 50 to 100% by volume of said about 15 to 100% of the particles being substantially discrete particles.

40. A composition of matter comprising solid particles a. having a 457 nanometer brightness of at least about 60;

b. having particle sizes of up to about 500 microns, with about 50 to 100% by volume of said particles having particle sizes in the range of about 1 to about 250 microns;

c. at least a portion of said solid particles being generally ellipsoidal particles that are substantially glassy;

d. at least a portion of said solid particles respectively having chemical compositions corresponding substantially with that of alkali feldspar;

e. said composition of matter comprising about 15 to 100% by volume of said generally ellipsoidal particles that have said chemical compositions, based on the total volume of solid particles present in said composition of matter; and f. about 50 to 100% by volume of said about 15 to 100% of the particles being substantially discrete particles.

41. A composition of matter comprising solid particles a. having a 457 nanometer brightness of at least about 60;

b. having particle sizes of up to about 500 microns, with about 50 to 100% by volume of said particles having particle sizes in the range of about 1 to about 250 microns;

c. at least a portion of said solid particles being generally ellipsoidal particles that are substantially glassy;

d. at least a portion of said solid particles respectively having chemical compositions corresponding substantially with that of plagioclase feldspar;

e. said composition of matter comprising about 15 to 100% by volume of said generally ellipsoidal particles that have said chemical compositions, based on the total volume of solid particles present in said composition of matter; and f. about 50 to 100% by volume of said about 15 to 100% of the particles being substantially discrete particles.

42. A composition of matter comprising solid particles a. having a 457 nanometer brightness of at least about 60;

b. having particle sizes of up to about 500 microns, with about 50 to 100% by volume of said particles having particle sizes in the range of about 1 to about 250 microns;

c. at least a portion of said solid particles being generally ellipsoidal particles that are substantially glassy;

d. at least a portion of said solid particles respectively having chemical compositions corresponding substantially with that of nepheline;

e. said composition of matter comprising about 15 to 100% by volume of said generally ellipsoidal particles that have said chemical compositions, based on the total volume of solid particles present in said composition of matter; and f. about 50 to 100% by volume of said about 15 to 100% of the particles being substantially discrete particles.

43. A composition of matter according to claim 35, 36, 37, 38, 39, 40, 41 or 42 in which the solid particles of said composition have an average particle size in the range of about 3 to about 100 microns.

44. A composition of matter according to claim 35, 36, 37, 38, 39, 40, 41 or 42 in which the solid particles of said composition have an average particle size in the range of about 3 to about 50 microns.

45. A composition of matter according to claim 35, 36, 37, 38, 39, 40, 41 or 42 in which the solid particles of said composition have an average particle size in the range of about 3 to about 25 microns.

46. A composition of matter according to claim 35, 36, 37, 38, 39, 40, 41 or 42 in which the average particle size of the solid particles is in the range of up to about 10 microns.

47. A composition of matter according to claim 35, 36, 37, 38, 39, 40, 41 or 42 in which the 457 nanometer brightness of the solid particles is at least about 80 and their average particle size is in the range of up to about 10 microns.

48. A composition of matter according to claim 35 or 39 including generally ellipsoidal solid particles with refractive index in the range of 1.6 and greater and particle sizes in the range of 75 microns and larger.

49. A composition of matter according to claim 35, 36, 37, 38, 39, 40, 41 or 42 in which about 90 to 100% by volume of the solid particles have diameters in the range of up to about 25 microns and about 60 to 100% by volume of the solid particles are generally ellipsoidal.

50. A composition of matter according to claim 35, 36, 37, 38, 39, 40, 41 or 42 in which 90 to 100% by volume of the solid particles have diameters in the range of up to about 15 microns and about 80 to 100% by volume of the solid particles are generally ellipsoidal.

51. A composition of matter according to claim 35, 36, 37, 38, 39, 40, 41 or 42 in which about 90 to 100% by volume of the solid particles have diameters in the range of up to 10 microns and about 90 to 100% by volume of the solid particles are generally ellipsoidal or substantially spherical.

52. A composition of matter according to claim 35, 36, 37, 38, 39, 40, 41 or 42 in which the 457 nanometer brightness is at least about 80, with about 90 to 100% by volume of the solid particles having diameters in the range of up to about 25 microns and with about 75 to 100% by volume of the solid particles being generally ellipsoidal or substantially spherical.

53. A composition of matter according to claim 35, 36, 37, 38, 39, 40, 41 or 42 in which the solid particles are generally ellipsoidal and have surfaces that have been modified by treatment with silane coupling agent, organic titanate coupling agent, surfactant, dispersant, wetting agent or etchant.

* * * * *